United States Patent
Roh et al.

(10) Patent No.: US 9,794,654 B2
(45) Date of Patent: Oct. 17, 2017

(54) POWER METERING SYSTEM, METHOD AND SYSTEM FOR MONITORING POWER CONSUMED BY LOAD

(71) Applicant: LSIS CO., LTD., Gyeonggi-do (KR)

(72) Inventors: Hee-Tae Roh, Gyeonggi-do (KR); Young-Gyu Yu, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/215,491

(22) Filed: Jul. 20, 2016

(65) Prior Publication Data

US 2017/0034599 A1 Feb. 2, 2017

(30) Foreign Application Priority Data

Jul. 28, 2015 (KR) .................. 10-2015-0106912

(51) Int. Cl.
*H04Q 9/00* (2006.01)
*G01D 4/00* (2006.01)
*H02J 3/38* (2006.01)

(52) U.S. Cl.
CPC .............. *H04Q 9/00* (2013.01); *G01D 4/004* (2013.01); *H02J 3/382* (2013.01); *G05B 2219/31408* (2013.01); *H04Q 2209/60* (2013.01); *Y02B 70/346* (2013.01); *Y02B 90/242* (2013.01); *Y02B 90/245* (2013.01); *Y04S 20/322* (2013.01); *Y04S 20/38* (2013.01); *Y04S 20/40* (2013.01); *Y04S 20/525* (2013.01)

(58) Field of Classification Search
CPC ....................................................... H04Q 9/00
USPC ................................................... 340/890.02
See application file for complete search history.

(56) References Cited

U.S. PATENT DOCUMENTS

| | | | | |
|---|---|---|---|---|
| 2011/0307200 A1* | 12/2011 | Hsu | ........................ | G06Q 50/06 702/61 |
| 2012/0173034 A1* | 7/2012 | Taima | ....................... | B60L 3/12 700/295 |
| 2012/0242451 A1* | 9/2012 | Tanaka | .................... | H02S 50/10 340/3.1 |
| 2012/0310559 A1* | 12/2012 | Taft | ..................... | H02J 13/0013 702/62 |
| 2016/0156188 A1* | 6/2016 | Baba | ...................... | G05B 15/02 700/296 |

(Continued)

FOREIGN PATENT DOCUMENTS

EP 2535727 A1 12/2012
JP 2012-204571 A 10/2012
(Continued)

OTHER PUBLICATIONS

European Search Report dated Dec. 14, 2016 corresponding to application No. 16176488.1-1568.
(Continued)

*Primary Examiner* — Qutbuddin Ghulamali
(74) *Attorney, Agent, or Firm* — Nath, Goldberg & Meyer; Jerald L. Meyer

(57) ABSTRACT

Disclosed embodiments relate to a power metering system, a method and a system for monitoring power consumed by loads by using the power metering system. In some embodiments, the system for monitoring power consumed by loads includes an external power supply source, a renewable energy sources, a distribution board, one or more power metering systems, and a monitoring server.

15 Claims, 25 Drawing Sheets

(56) References Cited

U.S. PATENT DOCUMENTS

2017/0034599 A1* 2/2017 Roh .................. H04Q 9/00

FOREIGN PATENT DOCUMENTS

| | | |
|---|---|---|
| JP | 2014-079138 A | 5/2014 |
| JP | 2015-033301 A | 2/2015 |
| KR | 1020110057559 A | 6/2011 |
| KR | 10-1396094 B1 | 5/2014 |
| KR | 1020140132523 A | 11/2014 |
| KR | 1020150011224 | 1/2015 |
| KR | 2015-0025645 A | 3/2015 |
| WO | 03017724 A2 | 2/2003 |
| WO | 2014141499 A1 | 9/2014 |
| WO | 2015004893 A1 | 1/2015 |

OTHER PUBLICATIONS

Korean Office Action dated Nov. 14, 2016 corresponding to application No. 952016081612225.

* cited by examiner (PRIOR ART)

POWER METERING SYSTEM, METHOD AND SYSTEM FOR MONITORING POWER CONSUMED BY LOAD

CROSS REFERENCE TO RELATED APPLICATIONS

This application claims the benefit of Korean Patent Application No. 10-2015-0106912, filed on Jul. 28, 2015 and entitled "POWER METERING SYSTEM, METHOD AND SYSTEM FOR MONITORING POWER CONSUMED BY LOAD", which is hereby incorporated by reference in its entirety.

TECHNICAL FIELD

The present disclosure relates to a power metering system, a method and a system for monitoring power consumed by loads by using the power metering system.

BACKGROUND

Consumer electronics and information devices have been developed to have various functions led by technology convergence/combination together with digital technology and network technology development. In addition, such digital convergence/combination devices and apparatuses are used widely at home and offices. However, supported functional convergence/combination and networking functions cause the consumer electronics and information devices to consume power by user's request and standby power while their users are not aware of the power consumption.

However, since users are not able to know how much power any specific one of their devices and apparatuses consumes over a specific period, they are not keen to save energy.

To address this problem, a technology currently available is to analyze and monitor the amount of consumed power and power consumption type by specifying a specific period for each electronic device by means of a meter for measuring total power consumed in each home and building in relation to monitoring energy consumed by each electronic device.

FIG. 1 shows a block diagram of a conventional system for monitoring power consumed by loads.

Referring to FIG. 1, in the conventional system for monitoring power consumed by loads, the power supplied from an external power supply source 1 to each home 3 may be supplied to consumer electronics connected to receptacles through a distribution board 2 installed in each home 3. In particular, the distribution board 2 includes a power meter 4 for checking the state of the consumed power and the amount of consumed power supplied from the external power supply source 1 and consumed in the consumer electronics in the home 3.

The aforementioned power meter 4 may use the information about the power consumed by the consumer electronics, and their power consumption patterns to monitor them individually through a remote server.

The conventional system and the method for monitoring power consumed by loads are not able to detect additional power coming in from other power generation sources or energy sources than the external power supply source 1. Moreover, where the system is designed by adding a conventional power meter requiring high precision to detect the additional power coming in, designing the system costs too much and another issue involved is the system becomes unnecessary too big as a result of configuration of unnecessary components.

SUMMARY

In view of the above, some embodiments of the present disclosure provides a power metering system for supplying energy to loads and monitoring the state of consumed energy supplied to the loads by adding a renewable energy source in addition to a conventional external power supply source, a system and a method for monitoring power consumed by the loads by using the power metering system.

Moreover, some embodiments of the present disclosure provides a power metering system for monitoring power consumed by loads by configuring an effective system requiring minimum costs in order to identify the amount and state of power consumed by the loads and power suppliers supplying power to the loads. Some embodiments of the present disclosure also provide a system and a method for monitoring power consumed by loads by using the power metering system.

Furthermore, some embodiments of the present disclosure provides a power metering system of high reliability and high efficiency to identify the amount and state of power consumed by loads and power suppliers supplying power to the loads. Some embodiments of the present disclosure also provides a system and a method for monitoring power consumed by the loads by using the power metering system.

In accordance with an aspect of some embodiments of the present disclosure, there is provided a system for monitoring power consumed by loads, which includes:

an external power supply source;

a renewable energy source configured to generate power or store the power applied from the external power supply source, and discharge the generated or stored power;

a distribution board configured to distribute the power applied from the external power supply source or the renewable energy source into electronic devices;

one or more power metering systems configured to detect a plurality of power data from the external power supply source, the renewable energy source, or the distribution board, respectively; and a monitoring server configured to collect power data detected in the respective one or more power metering systems, and monitor the operation mode of the renewable energy source, or the power consumed by loads on the basis of the collected power data.

In accordance with another aspect of some embodiments of the present disclosure, there is provided a power metering method for metering power, which includes:

collecting at least two power data among a first power data coming from an external power supply source, a second power data supplied to an electronic device, or power data of a renewal energy source;

checking the collected power data;

estimating power data that is not collected on a basis of the collected power data; and estimating an operation mode of the renewal energy source based on the collected power data and the estimated power data.

In accordance with further another aspect of some embodiments of the present disclosure, there is provided a power metering system for metering power, which includes:

an external power supply source;

a first renewable energy source configured to generate power;

a second renewable energy source configured to receive power from the external power supply source or the first renewable energy source and supply the power to a load connected to one end thereof;

a distribution board configured to receive power from the external power supply source or the first renewable energy source, and distribute the power to electronic devices;

a power metering system configured to detect power data of the external power supply source, the renewable energy sources, or the distribution board; and a power metering system configured to detect the power data of the second renewable energy source.

As described above, the power metering system, the system and the method for monitoring power consumed by loads by using the power metering system in accordance with embodiments of the present disclosure configure a system of high reliability and high performance requiring minimum costs, and calculate the power consumed by the loads efficiently.

DETAILED DESCRIPTION

Hereinafter, a power metering system, a method and a system for monitoring power consumed by loads by using the power metering system in accordance with embodiments of the present disclosure will be described in detail with reference to the accompanying drawings.

Figure 1:
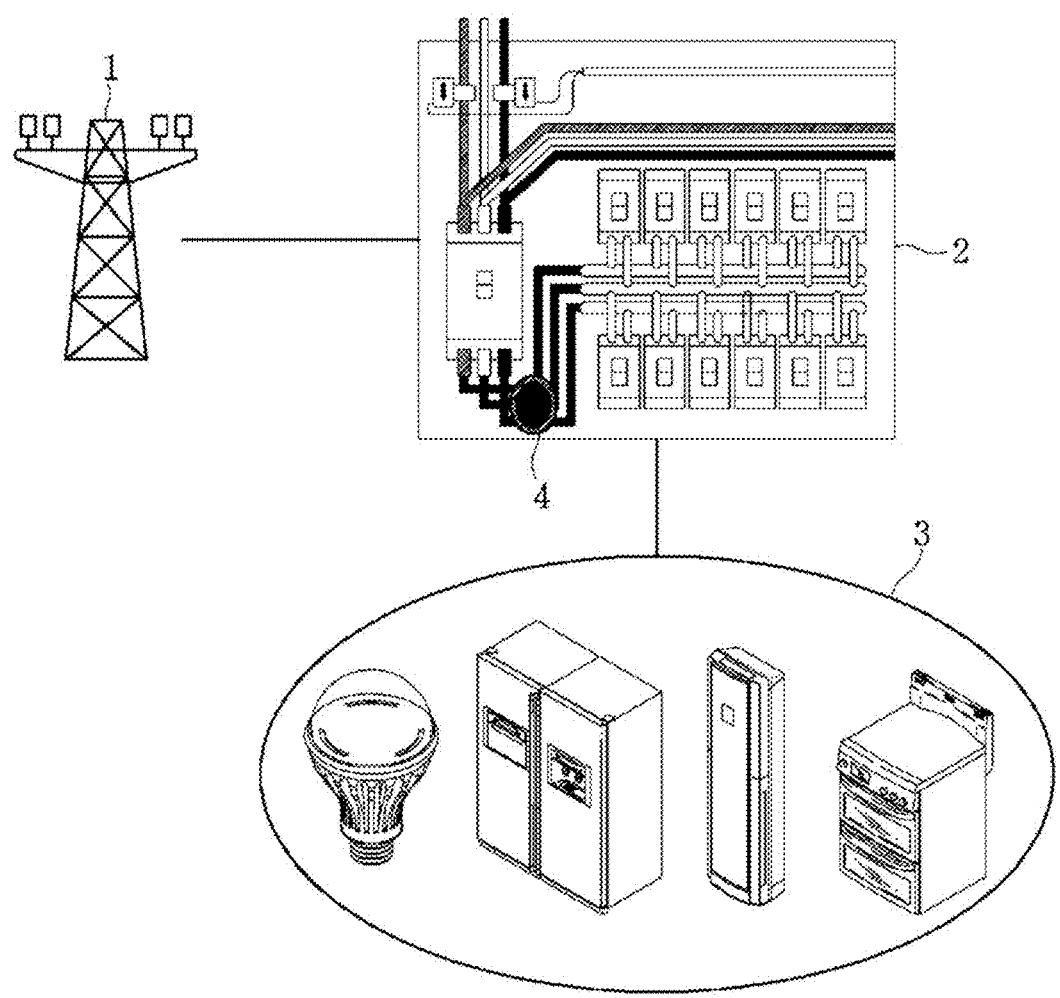
FIG. 1 shows a block diagram of a conventional system for monitoring power consumed by loads, according to the prior art.
Figure 2:
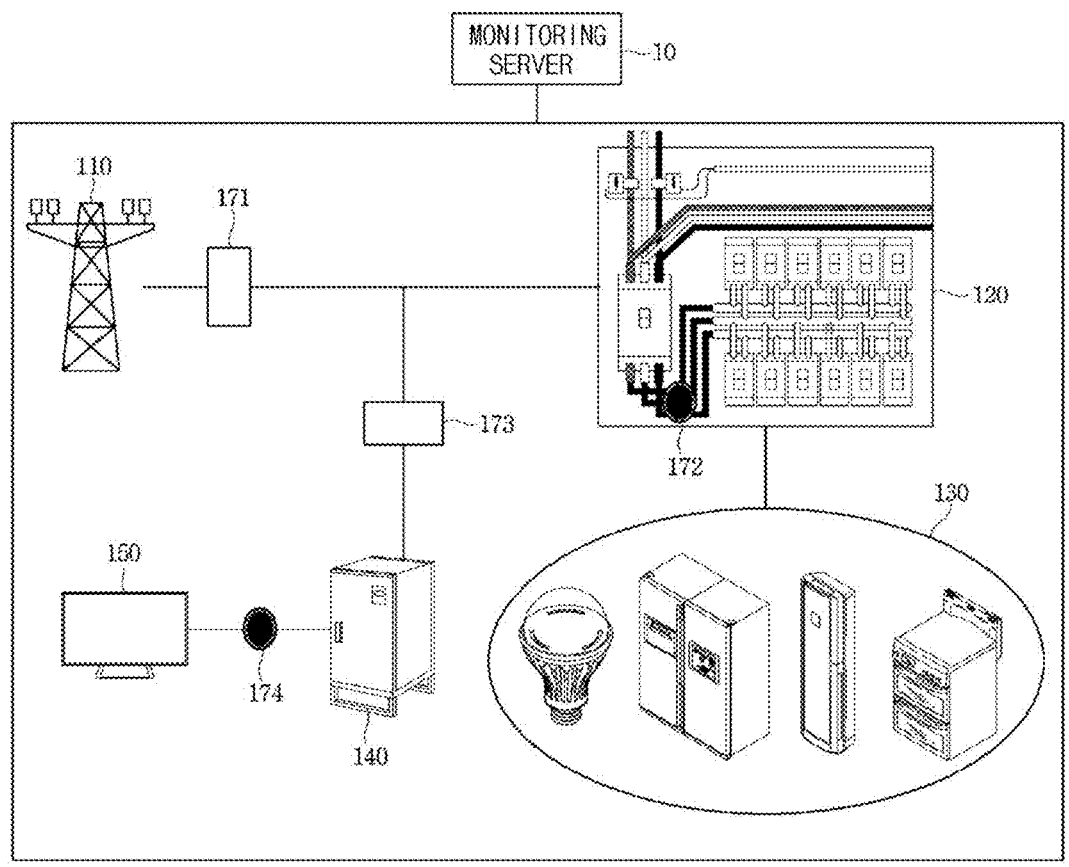
FIG. 2 shows a block diagram of a system for monitoring power consumed by loads in accordance with some embodiments of the present disclosure.

FIG. 2 shows a block diagram of a system for monitoring power consumed by loads in accordance with some embodiments of the present disclosure.

Referring to FIG. 2, the system for monitoring power consumed by loads in accordance with some embodiments of the present disclosure includes a monitoring server 10, an external power supply source 110, a distribution board 120, electronic devices 130 and 150 and an EES (electric energy storage) 140. In particular, one end or opposite ends of the external power supply source 110, the distribution board 120 and the EES 140 may be configured to include one of power metering systems 171, 172, 173 and 174 to detect power data coming into and going out of the aforementioned components. However, it should be noted that the configuration is not limited to the one described above, and the configuration may include some of the plurality of the power metering systems 171, 172, 173 and 174 in accordance with some embodiments.

Although renewable energy sources are described to be based on the EES in some embodiments of the present disclosure, it should be noted that the renewable energy sources are not limited thereto, and all renewable energy sources may be applicable, which are capable of generating power and discharging the generated power into one side thereof.

The monitoring server 10 may obtain power data including the power consumed by loads and power sources, incoming power or power consumption patterns measured by the power metering systems 171, 172, 173 and 174. It is thus possible to monitor and output the power consumed by the loads, based on the obtained data.

Figure 23:
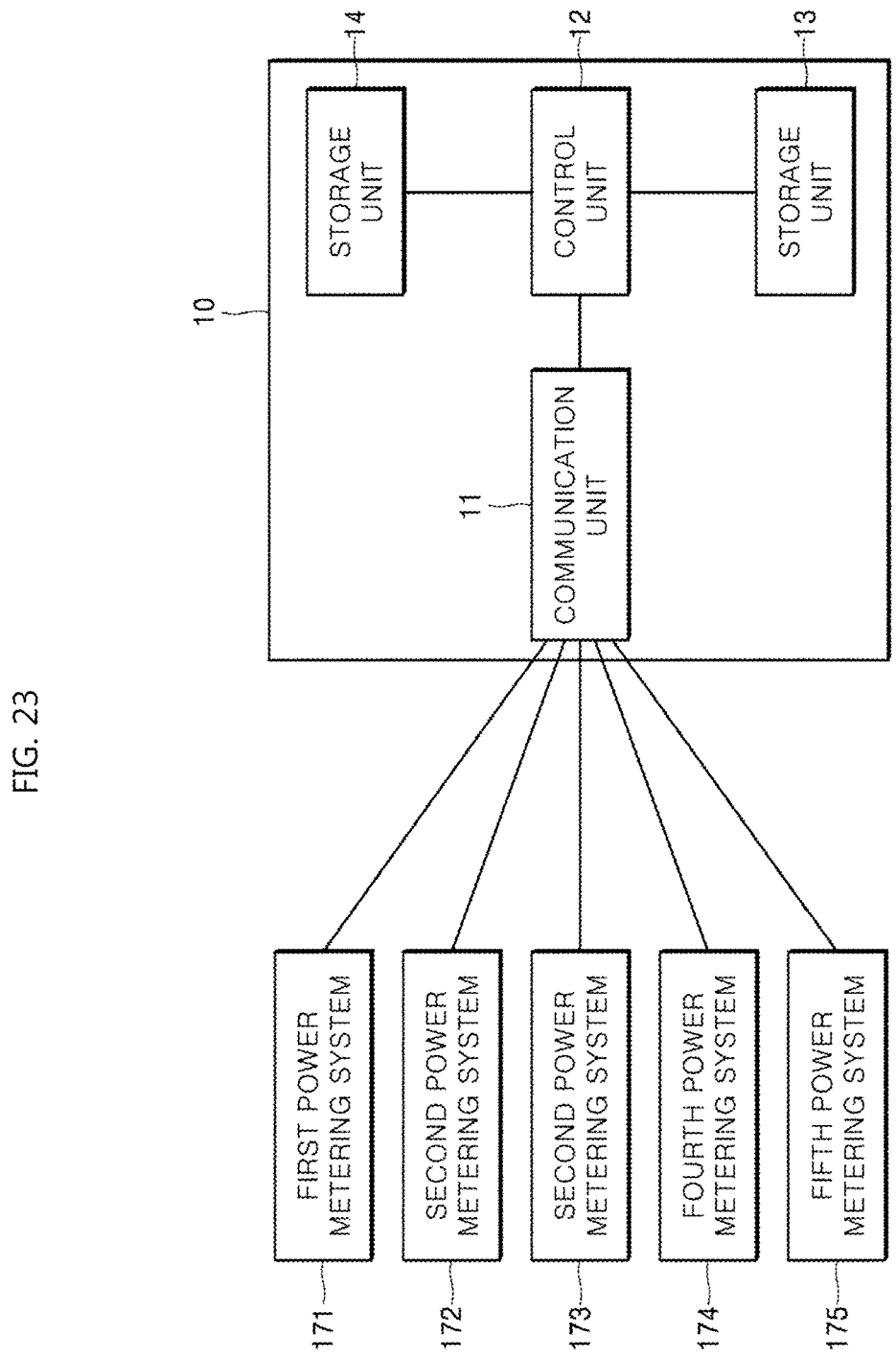
FIG. 23 shows a block diagram of a monitoring server in accordance with some embodiments of the present disclosure.

FIG. 23 shows a block diagram of a monitoring server in accordance with some embodiments of the present disclosure.

Referring to FIG. 23, the monitoring server 10 in accordance with some embodiments of the present disclosure may be configured to include a communication unit 11, a control unit 12, a storage unit 13, and an output unit 14.

The communication unit 11 may include one or more modules for enabling wireless or wire-based communication with the power metering systems 171, 172, 173, 174 and 175 or between external apparatuses.

The communication unit 11 may be configured in any form of a wireless Internet module in which WLAN (Wireless LAN) (Wi-Fi), Wibro (Wireless broadband), WiMAX (World Interoperability for Microwave Access) and HSDPA (High Speed Downlink Packet Access) are used, Bluetooth, or RFID (Radio Frequency Identification). Moreover, the communication unit 11 may be configured in various forms, for example, a short range communication module in which IrDA (Infrared Data Association), UWB (Ultra Wideband) and ZigBee are used, or a wired communication module. The communication unit 11 may receive power data from the power metering systems 171, 172, 173, 174 and 175.

The control unit 12 may check and analyze power data of the power metering systems 171, 172, 173, 174 and 175 received through the communication unit 11. The control unit 12 may extract and process power data or power use pattern data on the basis of the received power data of the power metering systems 171, 172, 173, 174 and 175. An analysis of the power use patterns may be carried out by means of the NILM (Non-intrusive Load Monitoring) algorithm. Furthermore, the control unit 12 may control the information about the power data and corresponding power metering systems to be stored in the storage unit 13 or outputted through the output unit 14.

The storage unit 13 may store the power data received through the communication unit 11. The storage unit 13 may store an algorithm for analyzing power use patterns executed in the control unit 12. Examples of the storage unit 13 include at least one type of a storage medium, for example, flash memory type, hard disk type, multimedia card-micro type, card-type memory such as SD or XD memory, RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk and optical disk types.

The output unit 14 may output the power data and analysis data received from the one or more power metering systems and processed in various forms, for example, video or audio data on the basis of control by the control unit 12. Examples of the output unit 14 may include a display unit and an audio output unit.

In addition, a user input unit (not shown) may be configured, and it is possible to control the server 10, or output monitored load power data (that is, power data consumed by loads) on the basis of the input through the user input unit.

As described above, the configuration for obtaining power data processed in the server 10 may include the external power supply source 110, the distribution board 120, the electronic devices 130 and 150 and the EES 140.

The power coming from the external power supply source 110 as an external power generation source, for example, power stations, may be supplied to various loads including the electronic devices 130 at home through the distribution board 120. In particular, where a renewable energy source is configured as the EES 140, the external power supply source 110 may allow power to be supplied to the EES 140 to charge.

The distribution board 120 may distribute power coming from the external power supply source 110 to be applied to various loads, for example, the electronic devices 130 at home.

The EES 140 may store power coming from the external power supply source 110 and allow the stored power to be applied to the electronic device 150 connected to one end of the EES 140 at a specific time (or when a user requests power application). For example, power is stored in the EES 140 when less power is consumed or electricity rate is cheaper during off-peak hours. Next, the EES may discharge the stored power into the electronic device 150 connected to one end thereof when power consumption sharply increases or electricity rate is higher during peak hours. Moreover, the EES 140 may not store the power coming from the external power supply source 110, but apply it directly to the electronic device 150 connected to one end thereof. In this example, the EES 140 may operate in AC PASS (for example, AC Pass Through mode in which the AC current is passed through) mode.

Each power metering system 171, 172, 173 and 174 may be configured to be connected to the input of the external power supply source 110 and the distribution board 120, and opposite ends of the EES 140.

A first power metering system 171 connected to the output of the external power supply source 110 may be configured with at least one module that may measure the power supplied from the external power supply source 110.

A second power metering system 172 connected to the input of the distribution board 120 may be configured with at least one module for measuring the power coming from the external power supply source 110 and used in various loads in case where the power is supplied to consumer-premises electronic devices 130. In particular, the second power metering system 172 may measure power use patterns of the loads in addition to measuring power consumed by the loads. That is, the second power metering system 172 may measure power data including load operation state information and power consumption pattern information in addition to the power consumed by the loads.

A third power metering system 173 and a fourth power metering system 174 may be connected to the input and the output of the EES 140, respectively. The third power metering system 173 may be configured with at least one module that is capable of measuring power applied from the external power supply 110. A fourth power metering system 174 may measure discharged power and the use pattern of the discharged power in case where the power stored in the EES 140 is discharged into loads, for example, the electronic device 150 connected to one end thereof. Furthermore, the fourth power metering system 174 may measure the power of the load 150 and the power use pattern thereof in case where the power applied from the external power supply source 110 passes (PASS) through the EES 140.

With reference to FIGS. 3 to 10 based on the configuration of the system for monitoring power consumed by loads including the power metering systems described above, the method for monitoring power consumed by loads in accordance with some embodiments of the present disclosure is described in detail herein below. Although the method for monitoring power consumed by loads is limited to and described about the sequence of collecting data, it should be noted that the data may be collected respectively from one or more power metering systems, independently of the sequence of collecting data.

FIGS. 3 to 10 shows flow charts illustrating operations of monitoring power consumed by loads to which the system for monitoring power consumed by the loads in accordance with some embodiments of the present disclosure is applied.

Figure 3:
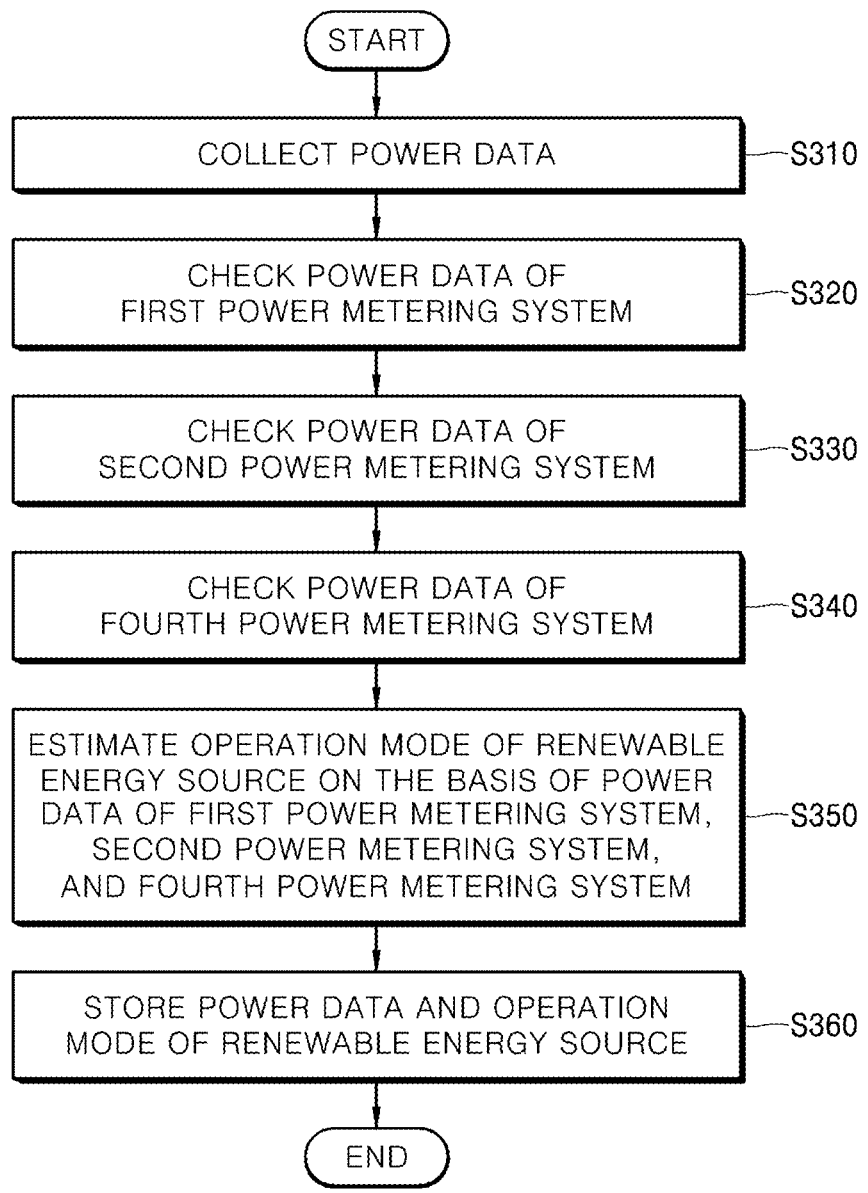
FIGS. 3 to 10 show flow charts illustrating operations of monitoring power consumed by loads to which the system for monitoring power consumed by the loads in accordance with some embodiments of the present disclosure is applied.

FIG. 3 shows a flow chart in accordance with a first embodiment illustrating operations for monitoring power consumed by loads where the EES 140 in the monitoring server 10 operates in AC PASS mode.

Referring to FIG. 3, the monitoring server 10 may collect power data from the power metering systems 171, 172, 173 and 174 through the communication unit 11 at operation S310.

The control unit 12 of the monitoring server 10 may check power data of the first power metering system 171 through the communication unit 11 at operation S320. More specifically, the control unit 12 may check first power data including the power applied from the external power supply source 110.

After checking the power data of the first power metering system 171, the control unit 12 of the monitoring server 10 may check second power data received from the second power metering system 172 at operation S330. Describing it in more detail, the control unit 12 may check the second power data and fourth power data including the information about power consumption and power consumption patterns used in the electronic devices 130 to which power is supplied through the distribution board 120, and the electronic device 150 to which power is supplied through the EES 140. In this example, the information about power consumption patterns may be obtained through the NILM (Non-intrusive Load Monitoring) algorithm. The NILM algorithm may analyze power and power consumption patterns used by respective electronic devices connected to the distribution board 120 from the power metering systems connected to the distribution board 120.

After checking the power data of the second power metering system 172, the control unit 12 of the monitoring server 10 may check the power data of the fourth power metering system 174 at operation S340. The control unit 12 may check power data including the information about power consumption patterns consumed in the load 150 connected to one end of the EES 140.

Moreover, the control unit 12 may obtain the information about the power consumed in the loads 130 and 150 connected to the system for monitoring power consumed by loads and their power consumption patterns by means of the sum of the power data of the second power metering system 172 and the power data of the fourth power metering system 174.

After checking the power data of the first power metering system 171, the second power metering system 172 and the fourth power metering system 174, the control unit 12 of the monitoring server 10 may compare the sum of the second power data of the second power metering system 172 and the fourth power data of the fourth power metering system 174 with the first power data of the first power metering system 171 to estimate the operation mode of the EES 140 at operation S350. That is, where the sum of the second power data and the fourth power data is equal to the first power data, it is estimated that the EES 140 operates in AC PASS mode to apply the power applied from the external power supply source 110 to the load connected to one end of the EES 140.

The control unit 12 of the monitoring server 10 may store the power data checked through the operation described above and the information about the operation mode of the EES 140 in the storage unit 13 at operation S360.

Figure 4:
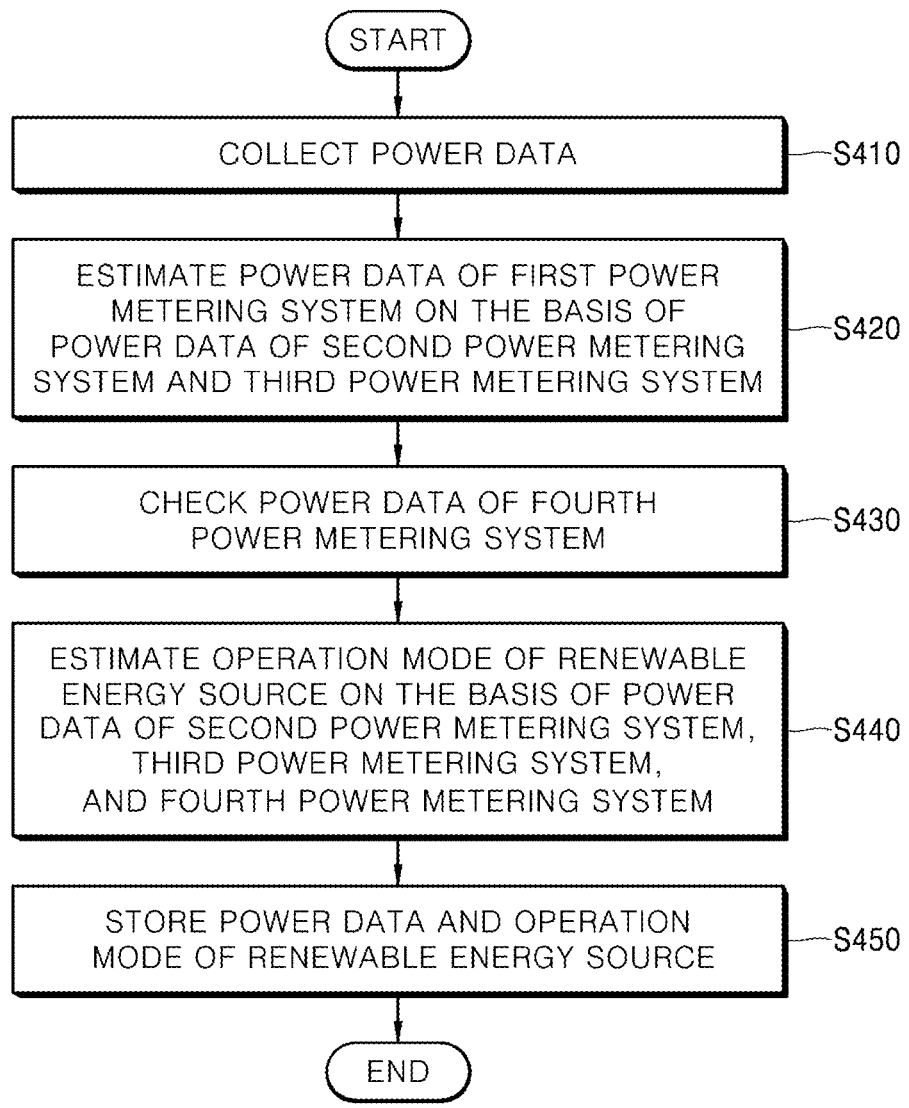

FIG. 4 shows a flow chart in accordance with a second embodiment illustrating operations for monitoring power consumed by loads when the EES 140 in the monitoring server 10 operates in AC PASS mode.

Referring to FIG. 4, the monitoring server 10 may collect power data from the power metering systems 171, 172, 173 and 174 through the communication unit 11 at operation S410.

The control unit 12 of the monitoring server 10 may estimate the first power data coming from the external power supply source 110, that is, the power data detected by the first power metering system 171 at operation S420. This estimate is based on the power data measured respectively by the second power metering system 172 configured in the input of the distribution board 120, and the third power metering system 173 configured in the input of the EES 140, in the collected power data.

After estimating the power data of the first power metering system 171, the control unit 12 of the monitoring server 10 may check the fourth power data received from the fourth power metering system 174 at operation S430. In this example, the control unit 12 may check total power consumption and power consumption patterns of the loads connected to the system for monitoring power consumed by the loads by means of the sum of the power data of the second power metering system 172 and the power data of the fourth power metering system 174, checked through the above operation. The second power data and the fourth power data may include the power consumed by respective loads 130 and 150, and power consumption pattern information. The power consumption pattern information of the second power data and the fourth power data may be obtained through the NILM (Non-intrusive Load Monitoring) algorithm.

The control unit 12 of the monitoring server 10 may estimate the operation mode of the EES 140 on the basis of the power data of the second power metering system 172, the third power metering system 173 and the fourth power metering system 174 at operation S440 after checking the power data of the fourth power metering system 174. More specifically, where the sum (+) of the second power data of the second power metering system 172 and the third power data of the third power metering system 173 is equal to the sum (+) of the second power data of the second power metering system 172 and the fourth power data of the fourth power metering system 174, it is estimated that the operation mode of the EES 140 is the AC PASS mode for applying the power from the external power supply source 110 to the load connected to one end thereof.

The control unit 12 of the monitoring server 10 may store the power data checked through the aforementioned operation and the information about operation mode of the EES 140 in the storage unit 13 at operation S450.

Figure 5:
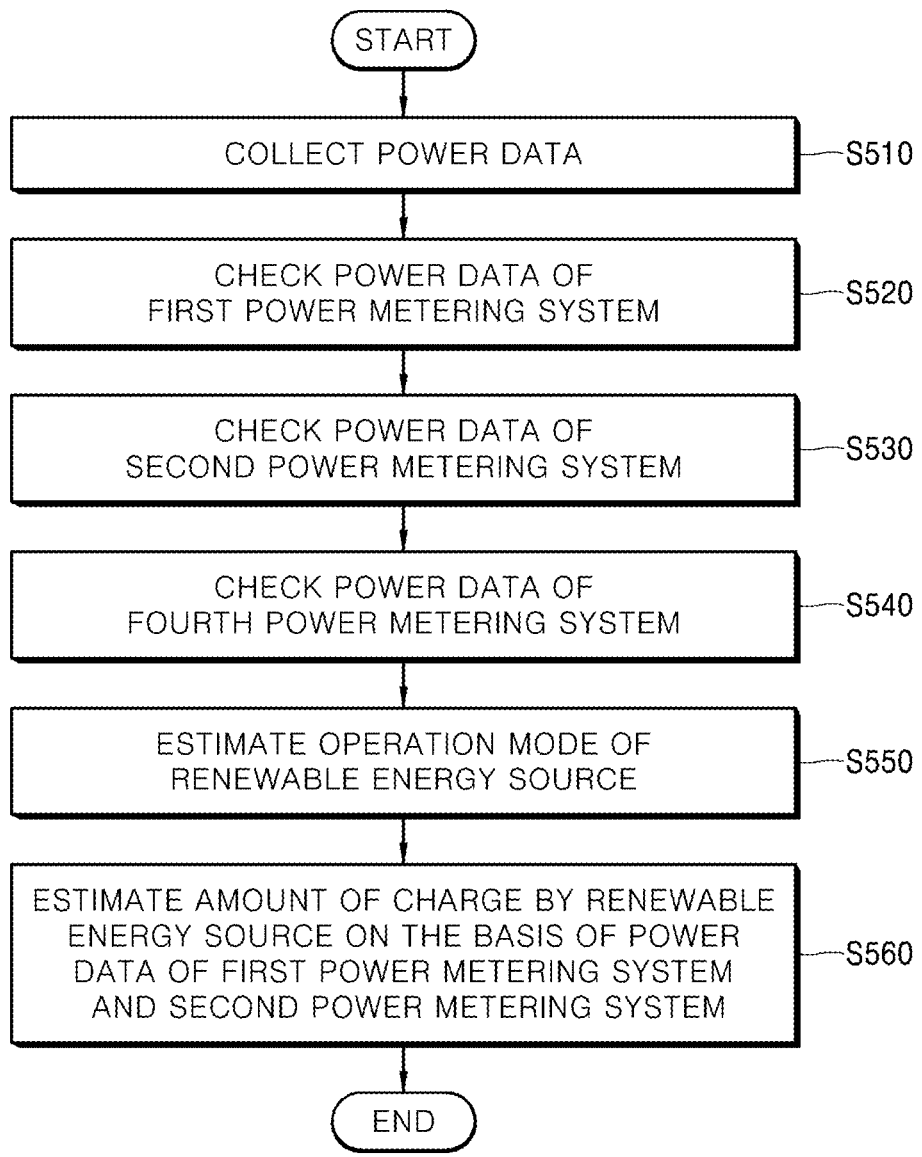

FIG. 5 shows a flow chart in accordance with a first embodiment illustrating operations for monitoring power consumed by loads where the EES 140 in the monitoring server 10 operates in charge mode.

Referring to FIG. 5, the monitoring server 10 may obtain power data from one or more power metering systems 171, 172, 173 and 174 through the communication unit 11 at operation S510.

The control unit 12 may check power data of the first power metering system 171 through the communication unit 11 at operation S520. The control unit 12 may check the first power data including the power applied from the external power supply source 110.

The control unit 12 of the monitoring server 10 may check the second power data received from the second power metering system 172 at operation S530 after checking the power data of the first power metering system 172. The control unit 12 may check the second power data including the information about the power consumption pattern information and power consumed by the electronic devices 130 to which power is supplied through the distribution board 120. In this example, the information about the power consumption patterns may be obtained through the NILM (Non-intrusive Load Monitoring) algorithm.

The control unit 12 of the monitoring server 10 may check the power data of the fourth power metering system 174 at operation S540 after checking the power data of the second power metering system 172. The control unit 12 may estimate the operation mode of the EES 140 at operation S550, on the basis of the power data of the fourth power metering system 174. Specifically, the control unit 12 may estimate that the EES 140 is in charge mode on the basis of the power data of the fourth power metering system 174 where the power data of the fourth power metering system 174 is 0, that is, power is not applied to the load 150 connected to one end of the EES 140.

The control unit 12 may estimate the amount of charge of the EES 140 by means of the difference (−) between the first power data of the first power metering system 171 and the second power data of the second power metering system 172 after estimating the EES 140 in charge mode.

Figure 6:
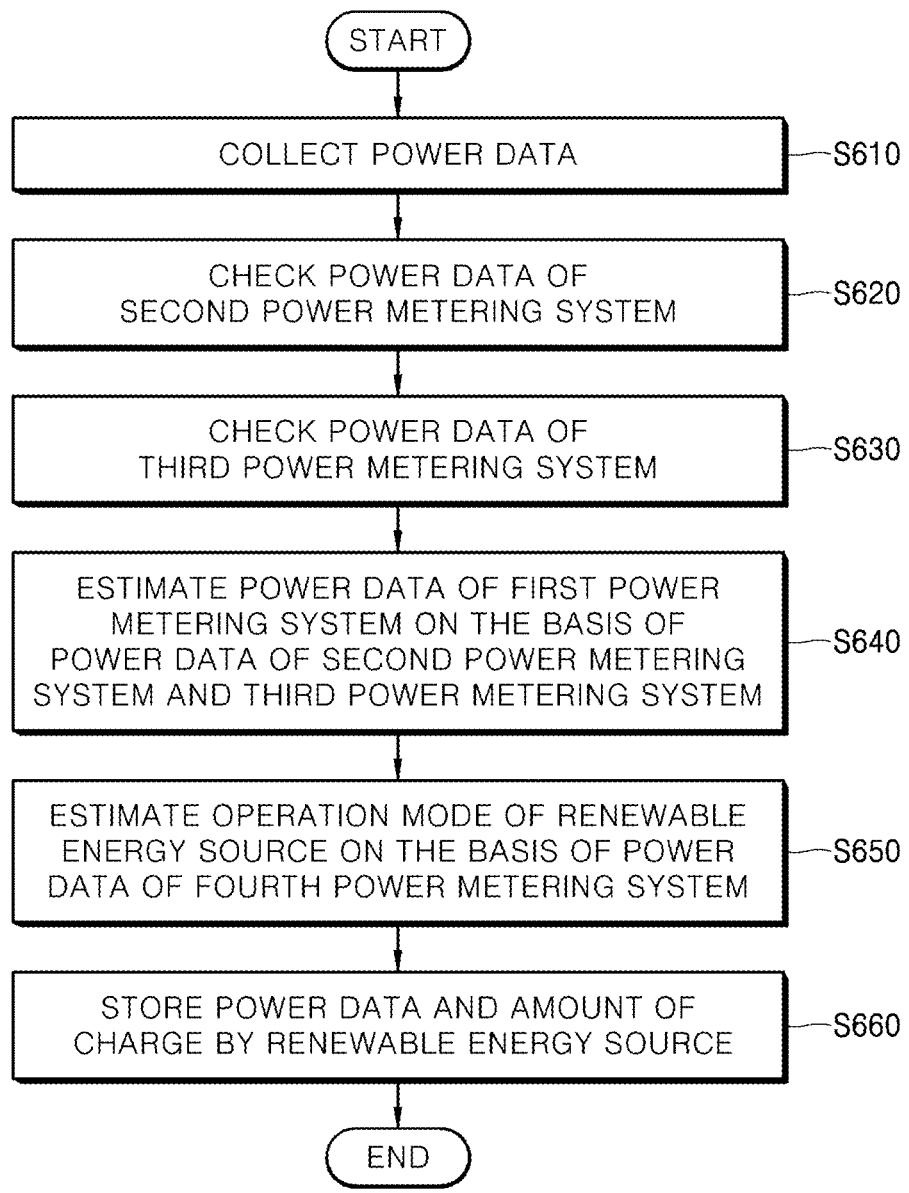

FIG. 6 shows a flow chart in accordance with a second embodiment illustrating operations for monitoring power consumed by loads where the EES 140 in the monitoring server 10 operates in charge mode.

Referring to FIG. 6, the monitoring server 10 may collect power data from the one or more power metering systems 171, 172, 173 and 174 through the communication unit 11 at operation S610.

The control unit 12 may check the second power data received from the second power metering system 172 in the collected power data at operation S620. The control unit 12 may check the second power data including the information about power consumption patterns and consumed power of the electronic devices 130 to which power is supplied through the distribution board 120. In this regard, the power consumption pattern information may be obtained through the NILM (Non-intrusive Load Monitoring) algorithm.

The control unit 12 may check the power data of the third power metering system 173 after checking the power data of the second power metering system 172. The power data of the third power metering system 173 may be the information about the power applied from the external power supply source 110 to the EES 140.

The control unit 12 may estimate the power data of the first power metering system 171 by means of the sum (+) of the second power data of the second power metering system 172 and the third power data of the third power metering system 173 at operation S640. In detail, the control unit 12 may estimate the information about the power applied from the external power supply source 110 by means of the sum of the power data applied to the distribution board 120 and the power data applied to the EES 140.

The control unit 12 may estimate the operation mode of the EES 140 on the basis of the power data of the fourth power metering system 174 after estimating the power data of the first power metering system 171 at operation S650. Specifically, the control unit 12 may estimate that the EES 140 is in charge mode where the power data detected in the fourth power metering system 174 is 0, that is, power is not applied to the load 150 connected to one end of the EES 140. In this example, the control unit 12 may estimate the amount of charge of the EES 140 on the basis of the power data of the third power metering system 173.

The control unit 12 of the monitoring server 10 may store the information about the power data checked through the operation described above and the operation mode of the EES 140, and the amount of charge in the storage unit 13 at operation S660.

Figure 7:
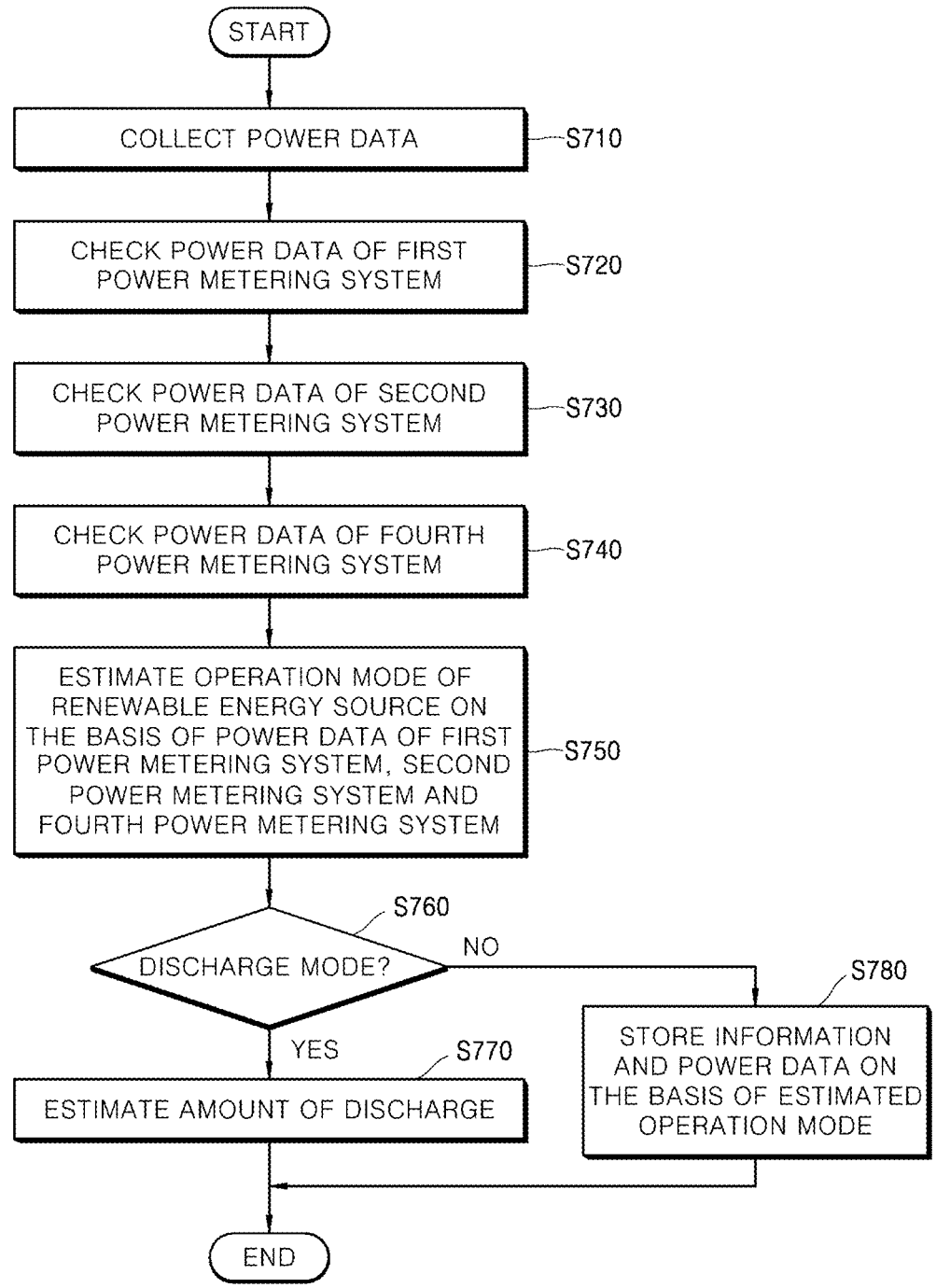

FIG. 7 shows a flow chart in accordance with a first embodiment illustrating operations for monitoring power consumed by loads when the EES 140 in the monitoring server 10 operates in discharge mode (power generation source).

Referring to FIG. 7, the monitoring server 10 may collect power data from the one or more power metering systems 171, 172, 173 and 174 through the communication unit 11 at operation S710.

The control unit 12 of the monitoring server 10 may check the power data of the first power metering system 171 collected through the communication unit 11 at operation S720. The control unit 12 may check the first power data including the power applied from the external power supply source 110.

The control unit 12 of the monitoring server 10 may check the power data of the second power metering system 172 at operation S730 after checking the power data of the first power metering system 171. The control unit 12 may check the second power data including the information about power consumption patterns and power consumed by the electronic devices 130 to which power is supplied through the distribution board 120. In this regard, the power consumption pattern information may be obtained through the NILM (Non-intrusive Load Monitoring) algorithm.

The control unit 12 of the monitoring server 10 may check the fourth power data received from the fourth power metering system 174 at operation S740 after checking the power data of the second power metering system 172. The control unit 12 may check the power data including the information about the power consumed in the load 150 connected to one end of the EES 140, and its power consumption patterns.

Moreover, it may obtain the information about the power consumed in the load connected to the load power monitoring system and power consumption patterns thereof by means of the sum of the power data of the second power metering system 172 and the power data of the fourth power metering system 174.

The control unit 12 of the monitoring server 10 may estimate the operation mode of the EES 140 on the basis of the power data at operation S750 after checking the power data of the first power metering system 171, the second power metering system 172 and the fourth power metering system 174. That is, the control unit 12 may estimate that the operation mode of the EES 140 is the discharge mode where the first power data of the first power metering system 171 is equal to the second power data of the second power metering system 172, and the fourth power data of the fourth power metering system 174 is greater than 0.

Therefore, the control unit 12 decides at operation S760 whether the operation mode of the EES 140 estimated on the basis of the first power data, the second power data and the fourth power data is the discharge mode. Next, the control unit 12 may estimate the fourth power data of the fourth power metering system 174 as the amount of discharge by the EES 140 after estimating that the EES 140 is in discharge mode. The estimated data of discharge may be stored in the storage unit 13.

On the other hand, the control unit 12 may store the information about the estimated operation mode and the detected power data in the storage unit 13 at operation S780 where the EES 140 is not in discharge mode. More specifically, the control unit 12 may estimate the operation mode of the EES 140 on the basis of the first power data, the second power data and the fourth power data where the estimated operation mode of the EES 140 is not the discharge mode. In other words, where the sum of the second power data and the fourth power data is equal to the first power data, the EES 140 may be estimated to be in AC PASS mode. Otherwise, where the fourth power data is 0, the EES 140 may be estimated to be in charge mode. Accordingly, the control unit 12 may estimate the operation mode of the EES 140 on the basis of the first power data, the second power data and the fourth power data, and store the estimated operation mode and the power data including the information about the amount of charge in the storage unit 13 as described above. Details of estimating the charge mode, the AC PASS mode and the power of the EES 140 are already described above while describing FIGS. 3 and 5, and thus omitted here.

Figure 8:
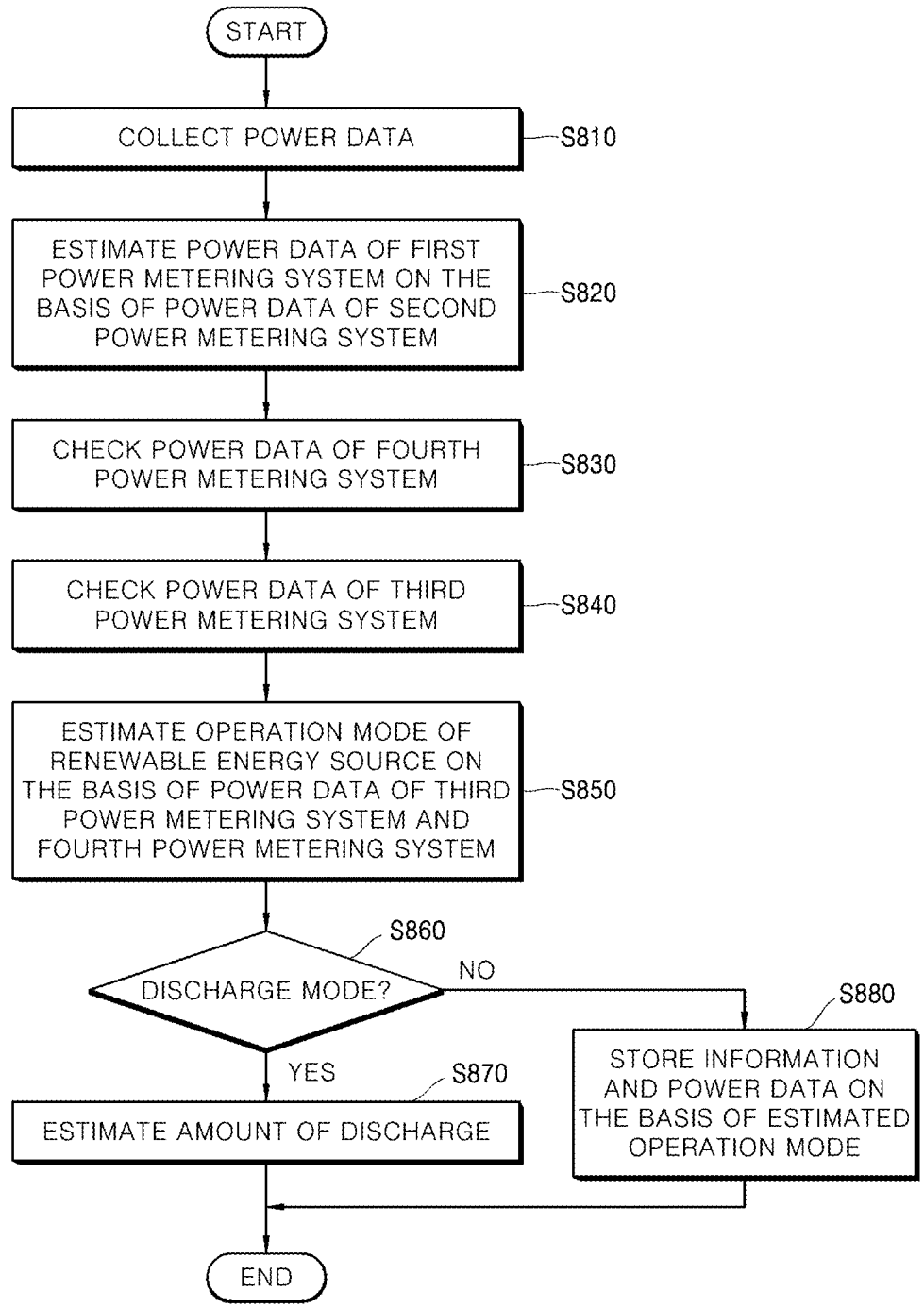

FIG. 8 shows a flow chart in accordance with a second embodiment illustrating operations for monitoring power consumed by loads where the EES 140 in the monitoring server 10 operates in discharge mode (e.g., as a power generation source).

Referring to FIG. 8, the monitoring server 10 may collect power data from the power metering systems 171, 172, 173 and 174 through the communication unit 11 at operation S810.

The control unit 12 of the monitoring server 10 may estimate the power data of the first power metering system 171 on the basis of the power data of the second power metering system 172 in the collected data. In other words, the control unit 12 may estimate the power data applied from the external power supply source 110 on the basis of the power data of the second power metering system 172 at operation S820.

The control unit 12 may check the power data of the fourth power metering system 174 at operation S830 after estimating the power data of the first power metering system 171. The checked power data of the fourth power metering system 174 may include the information about the power consumed from the power applied from the EES 140 and power consumption patterns of the load 150 connected to one end of the EES 140.

The control unit 12 may check the power data of the third power metering system 173 at operation S840 after checking the power data of the first power metering system 171. The power data of the third power metering system 173 may be the power applied from the external power supply source 110 to the EES 140.

The control unit 12 of the monitoring server 10 may estimate the operation mode of the EES 140 based on the power data of the third power metering system 173 and the fourth power metering system 174 at operation S850. Specifically, the control unit 12 may estimate that the EES 140 operates in discharge mode where the third power data of the third power metering system 173 is 0, and the fourth power data of the fourth power metering system 174 is greater than 0. To say that again, where the power applied from the external power supply source 110 is 0, and power data consumed in the load 150 connected to one end of the EES 140 is detected, it is estimated that the operation mode is the discharge mode in which the power stored in the EES 140 is applied to the load 150.

The control unit 12 decides that the operation mode of the EES 140 is the discharge mode at operation S860, and if YES, then it may estimate that the power data of the fourth power metering system 174 is the power discharged by the EES 140 at operation S870. The estimated power discharged by the EES 140 may be stored in in the storage unit 13.

On the other hand, the control unit 12 may store the information and power data on the basis of the estimated operation mode in the storage unit 13 at operation S880 where the EES 140 is not in discharge mode. In more detail, the control unit 12 may estimate the operation mode of the EES 140 again on the basis of the third power data and the fourth power data where the estimated operation mode of the EES 140 is not the discharge mode. That is to say, the EES 140 is estimated to be in charge mode where the third power data is not 0 but the fourth power data is 0. Otherwise, where the third power data is equal to the fourth power data, the EES 140 may be estimated to be in AC PASS mode. Therefore, the control unit 12 may estimate the operation mode of the EES 140 on the basis of the third power data and the fourth power data described above, and store the power data including the information about the estimated operation mode and the amount of charge in the storage unit 13. Since details of estimating the charge mode, the AC PASS mode and the amount of power of the EES 140 are already described above while describing FIGS. 4 and 6, it is omitted here.

Figure 9:
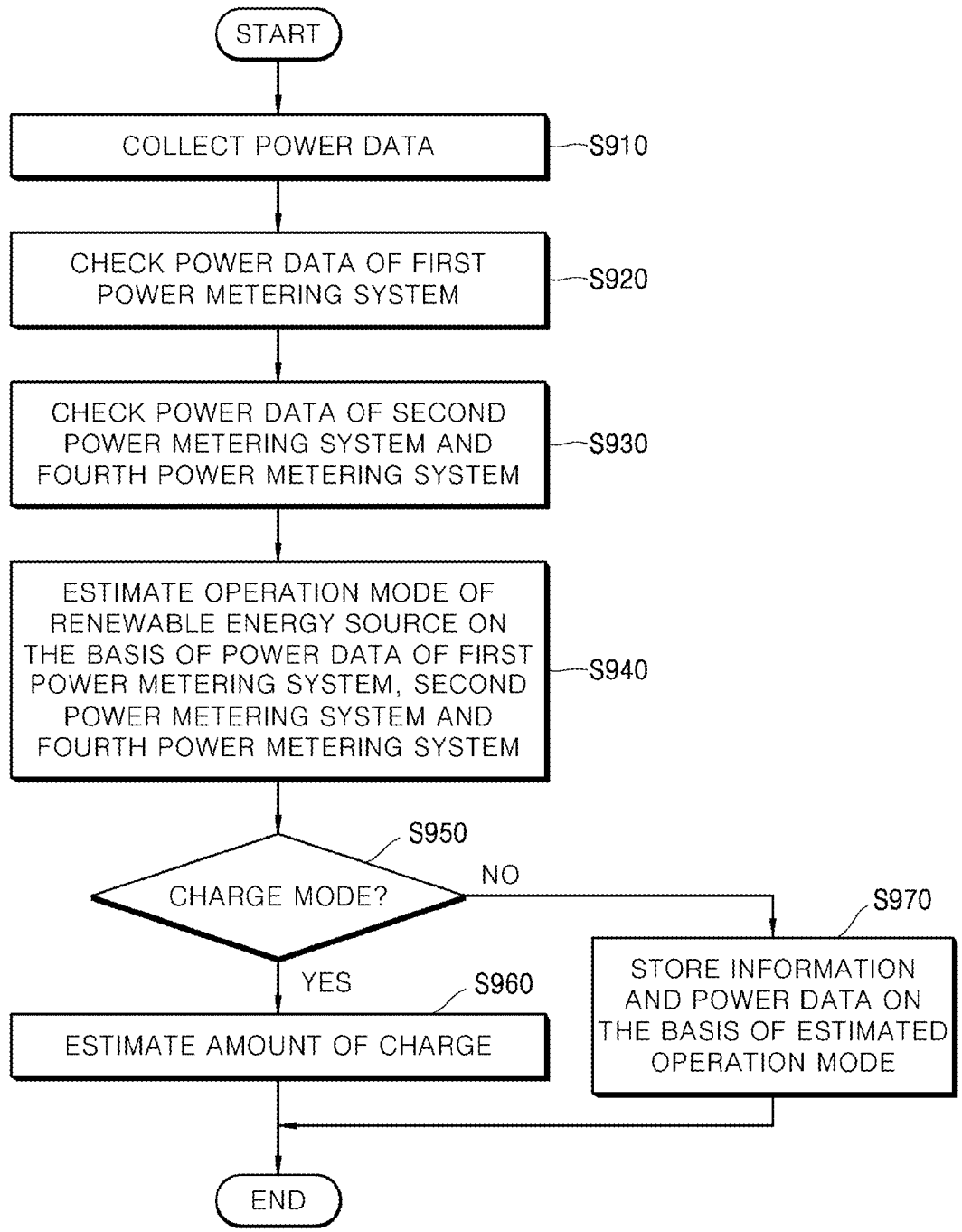

FIG. 9 shows a flow chart in accordance with a first embodiment illustrating operations for monitoring power consumed by loads for estimating the operation mode and resultant power data of the EES 140 in the monitoring server 10.

Referring to FIG. 9, the monitoring server 10 may collect power data from one or more power metering systems 171, 172, 173 and 174 through the communication unit 11 at operation S910.

The control unit 12 may check the power data of the first power metering system 171 through the communication unit 11 at operation S920. The control unit 12 may check the first power data including the power applied from the external power supply source 110.

The control unit 12 may check the power data received from the second power metering system 172 and the fourth power metering system 174 through the communication unit 11 at operation S930. The power data of the second power metering system 172 and the fourth power metering system 174 may include the information about consumed power and power consumption patterns of the power applied from the distribution board 120 and the EES 140, respectively. In this example, the power consumption pattern information may be obtained through the NILM (Non-intrusive Load Monitoring) algorithm.

Furthermore, it is possible to obtain the information about the power consumed in the loads connected to the system for monitoring power consumed by the loads and their power consumption patterns by means of the sum of the power data of the second power metering system 172 and the power data of the fourth power metering system 174.

The control unit 12 may estimate the operation mode of the EES 140 based on the first power data of the first power metering system 171, the second power data of the second power metering system 172 and the fourth power data of the fourth power metering system 174 at operation S940. Specifically, the control unit 12 may estimate the operation mode of the EES 140 on the basis of the result value after calculating the difference (−) of the sum of the second power data and the fourth power data from the first power data. For example, where the sum of the second power data and the fourth power data is smaller than the first power data, it is estimated that the EES operates in charge mode.

The control unit 12 may decide whether the estimated operation mode of the EES 140 is the charge mode at operation S950, and estimate that the calculated result value is the amount of charge after deciding that the estimated operation mode of the EES 140 is the charge mode. The estimated amount of charge data may be stored in the storage unit 13.

Meanwhile, the control unit 12 may store the information and the power data on the basis of the estimated operation mode where the EES 140 is not in charge mode at operation S970. More specifically, the control unit 12 may estimate the operation mode of the EES 140 on the basis of the first power data, the second power data and the fourth power data where the estimated operation mode of the EES 140 is not the charge mode. That is to say, where the sum of the second power data and the fourth power data is equal to the first power data, the EES 140 may be estimated to be in AC PASS mode. Otherwise, where the first power data is equal to the second power data, and the fourth power data is greater than 0, the EES 140 may be estimated to be in discharge mode. Accordingly, the control unit 12 may estimate the operation mode of the EES 140 on the basis of the first power data, the second power data and the fourth power data, and store the estimated operation mode and the power data including the information about the amount of discharge in the storage unit 13 as described above. Details of estimating the discharge mode, the AC PASS mode and the power of EES 140 are already described above while describing FIGS. 3 and 7, and thus omitted here.

Figure 10:
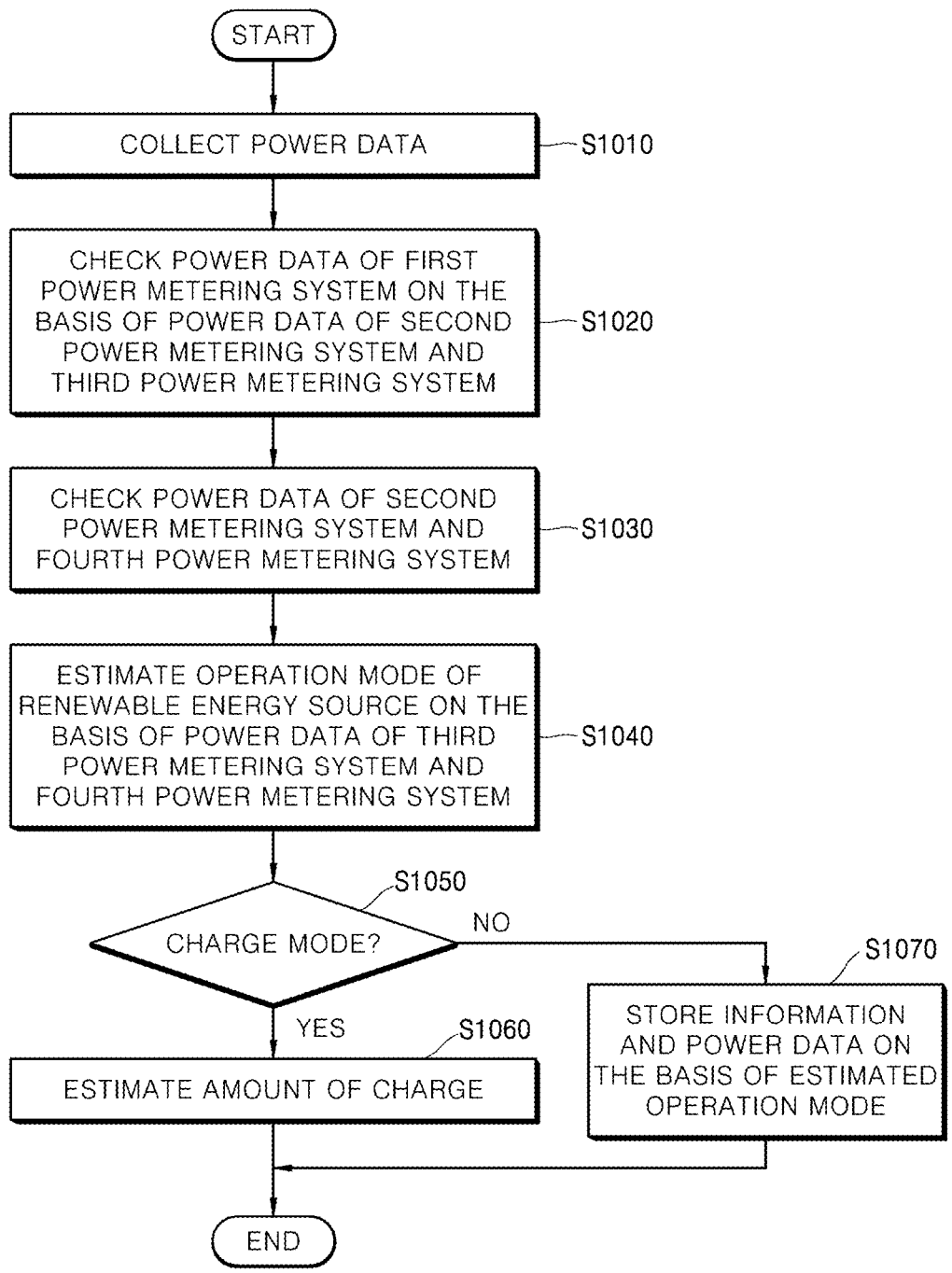

FIG. 10 is a flow chart in accordance with a second embodiment illustrating operations for monitoring power consumed by loads to estimate the operation mode and the resulting power data of the EES 140 in the monitoring server 10.

Referring to FIG. 10, the monitoring server 10 may collect power data from the one or more power metering systems 171, 172, 173 and 174 through the communication unit 11 at operation S1010.

The control unit 12 of the monitoring server 10 may estimate the first power data coming from the external power supply source 110, that is, the power data detected from the first power metering system 171 at operation S1020. This process is based on the power data measured respectively from the second power metering system 172 connected to the input of the distribution board 120 and the third power metering system 173 connected to the input of the EES 140 in the collected power data.

After estimating the power data of the first power metering system 171, the control unit 12 of the monitoring server 10 may check the fourth power data received from the fourth power metering system 174 at operation S1030. At this time, the control unit 12 may check total power consumed by the loads connected to the system for monitoring power and their consumption patterns by means of the sum of the power data of the second power metering system 172 and the power data of the fourth power metering system 174 checked through the above operation.

After checking the power data of the fourth power metering system 174, the control unit 12 of the monitoring server 10 may estimate the operation mode of the EES 140 based on the power data of the third power metering system 173 and the fourth power metering system 174 at operation S1040. Specifically, the control unit 12 may estimate that the operation mode of the EES 140 is the discharge mode where the power data of the third power metering system 173 is greater than the power data of the fourth power metering system 174.

The control unit 12 may estimate the amount of charge of the EES 140 by means of the difference of the power data of the third power metering system 173 from the power data of the fourth power metering system 174 where the operation mode of the EES 140 is the charge mode after deciding whether the EES 140 is in charge mode at operation S1050. The estimated amount of charge of the EES 140 may be stored in in the storage unit 13.

On the other hand, the control unit 12 may store the state information and power data on the basis of the estimated operation mode in the storage unit 13 where the estimated operation mode of the EES 140 is not the charge mode. In more detail, the control unit 12 may estimate the operation mode of the EES 140 again on the basis of the third power data and the fourth power data where the estimated operation mode of the EES 140 is not the charge mode. In other words, where the third power data is equal to the fourth power data, the EES 140 may be estimated to be in AC PASS mode. Otherwise, the EES 140 may be estimated to be in discharge mode where the third power data is 0, but the fourth power data is greater than 0. Therefore, the control unit 12 may estimate the operation mode of the EES 140 on the basis of the third power data and the fourth power data as described above, and store the power data including the information about the estimated operation mode and the amount of discharge in the storage unit 13.

Since details of estimating the discharge mode, the AC PASS mode and the power of the EES 140 are already described above while describing FIGS. 4 and 8, they are thus omitted here.

As described above, the control unit 12 may output information obtained by monitoring power consumed by loads to which the system for monitoring power consumed by loads in accordance with some embodiments of the present disclosure is applied through the output unit 14 when a user requests to output the information.

As described above, the system for monitoring power consumed by loads in accordance with some embodiments of the present disclosure may be configured to include a renewable energy source, for example, an electric energy storage for storing power applied from an external power supply source. The renewable energy source may pass or discharge the power applied from the external power supply source, or charge a load connected to one end thereof with the power. The power data dependent on the power consumed as described above may be estimated or checked on the basis of the power data obtained from at least one or more power metering systems which are components of the system for monitoring power consumed by loads. Furthermore, the operation mode of the renewable energy source may be estimated on the basis of the estimated or checked power data.

Figure 11:
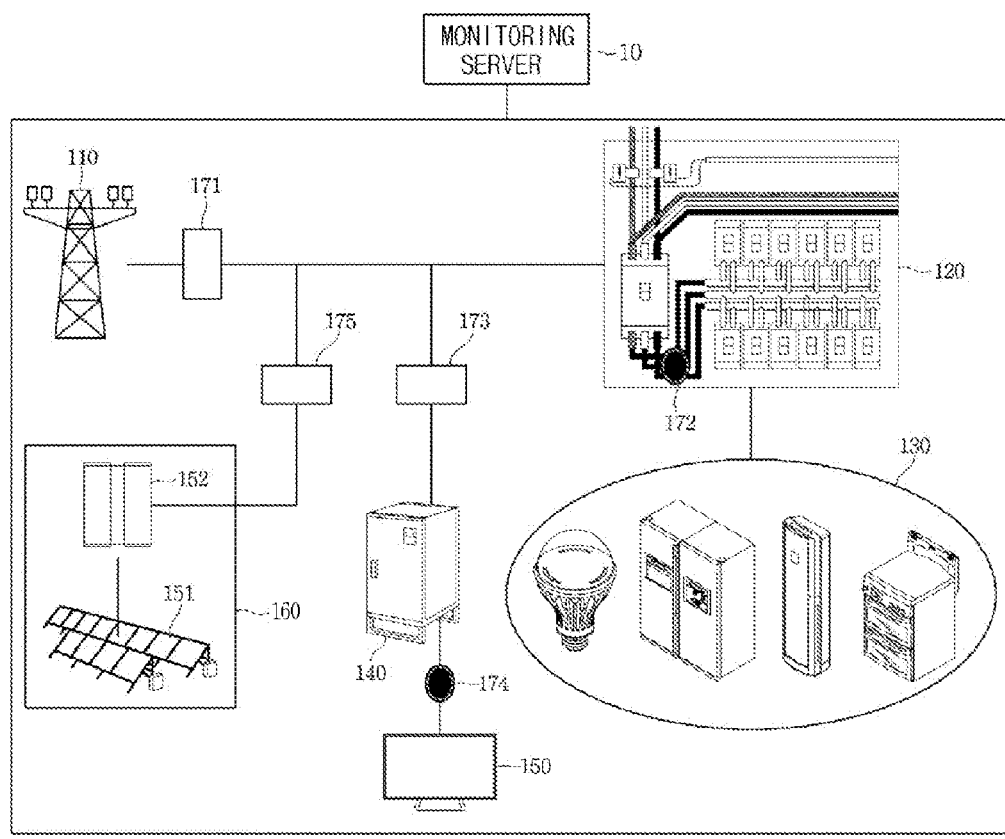
FIG. 11 shows a block diagram of a system for monitoring power consumed by loads in accordance with some embodiments of the present disclosure.

FIG. 11 shows a block diagram of a system for monitoring power consumed by loads in accordance with some embodiments of the present disclosure.

Referring to FIG. 11, the system for monitoring power consumed by loads in accordance with some embodiments of the present disclosure includes a monitoring server 10, an external power supply source 110, a distribution board 120, electronic devices 130 and 150, an EES 140 and a photovoltaic power generation system 160. In particular, the power metering systems 171, 172, 173, 174 and 175 may be configured to be connected to one end or both ends of the external power supply source 110, the distribution board 120, the EES 140 and the photovoltaic power generation system 160 to detect power data coming thereinto or going out thereof.

In still some embodiments of the present disclosure, an renewable energy source is described, which is configured with both the EES 140 and the photovoltaic power generation system 160, that is to say, a connection of a plurality of renewable energy sources.

The monitoring server 10 may obtain power data including the power consumed by loads and power sources, coming power, the amount of charge and discharge, and power consumption patterns measured by the power metering systems 171, 172, 173, 174 and 175. It may monitor and output the power consumed by the loads based on the obtained data.

Since the configuration of the monitoring server 10 is already described while describing some embodiments with reference to FIG. 23, detailed description thereof is omitted here.

The external power supply source 110 is an external power generation source like a power station, and the power coming from the external power supply source 110 may be supplied to various loads including consumer-premises electronic devices 130 through the distribution board 120. In particular, the external power supply source 110 may supply power to the EES 140 to charge with the power where the renewable energy source is configured with the EES 140.

The distribution board 120 may distribute the power coming from the external power supply source 110, or the power applied by the renewable energy source to be applied to various loads, for example, the consumer-premises electronic devices 130.

The EES (EES) 140 may store the power coming from the external power supply source 110, and apply the stored power to the electronic device 150 connected to one end of the EES 140 at a given time or when a user requests power application. For example, power may be stored in the EES 140 when less power is consumed or electricity rate is cheaper during off-peak hours, and the stored power may be discharged into the electronic device 150 connected to one end thereof when the demand for power is sharply rising or the electricity rate is more expensive.

The photovoltaic power generation system 160 may be configured to include a solar module 151 and a control module 152. The control module 152 may convert the solar energy incident onto the solar module 151 of the photovoltaic power generation system 160 to AC power and supply it to the distribution board 120 or the EES 140.

The respective power metering system 171, 172, 173, 174 and 175 may be configured to be connected to the external power supply source 110, the input of the distribution board 120, both ends of the EES 140 and the output of the photovoltaic power generation system 160.

The first power metering system 171 connected to the output of the external power supply source 110 may be configured with at least one module capable of measuring the power supplied from the external power supply source 110.

The second power metering system 172 connected to the input of the distribution board 120 may be configured with at least one module for measuring the power consumed by the loads where the power coming from the external power supply source 110 is supplied to various loads, for example, consumer-premises electronic devices 130. In particular, the second power metering system 172 may measure power use patterns of the loads in addition to measuring the power consumed by the loads. That is, the second power metering system 172 may measure power data including the load operation state information and the power consumption pattern information in addition to the power consumed by the loads.

The third power metering system 173 and the fourth power metering system 174 may be connected to the input and the output of the EES 140, respectively. The third power metering system 173 may be configured with at least one module capable of measuring power applied from the external power supply 110. The fourth power metering system 174 may measure the amount of power discharge and the pattern of the power discharge where the power stored in the EES 140 is discharged into loads, for example, the electronic device 150 connected to one end thereof.

A fifth power metering system 175 connected to the output of the photovoltaic power generation system 160 may be configured with at least one module capable of measuring the power generated by the photovoltaic power generation system 160.

With reference to FIGS. 12 to 22 based on the configuration of the system for monitoring power consumed by loads including a plurality of renewable energy sources and the power metering systems described above, a method for monitoring power consumed by loads in accordance with some embodiments of the present disclosure is described in detail herein below. Although the method for monitoring power consumed by loads is limited to and described about the sequence of collecting data, it should be noted that the data may be collected respectively from one or more power metering systems, independently of the sequence of collecting data.

FIG. 12 to FIG. 22 show flow charts of the process of monitoring power consumed by loads to which the system for monitoring power consumed by loads in accordance with some embodiments of the present disclosure is applied.

Figure 12:
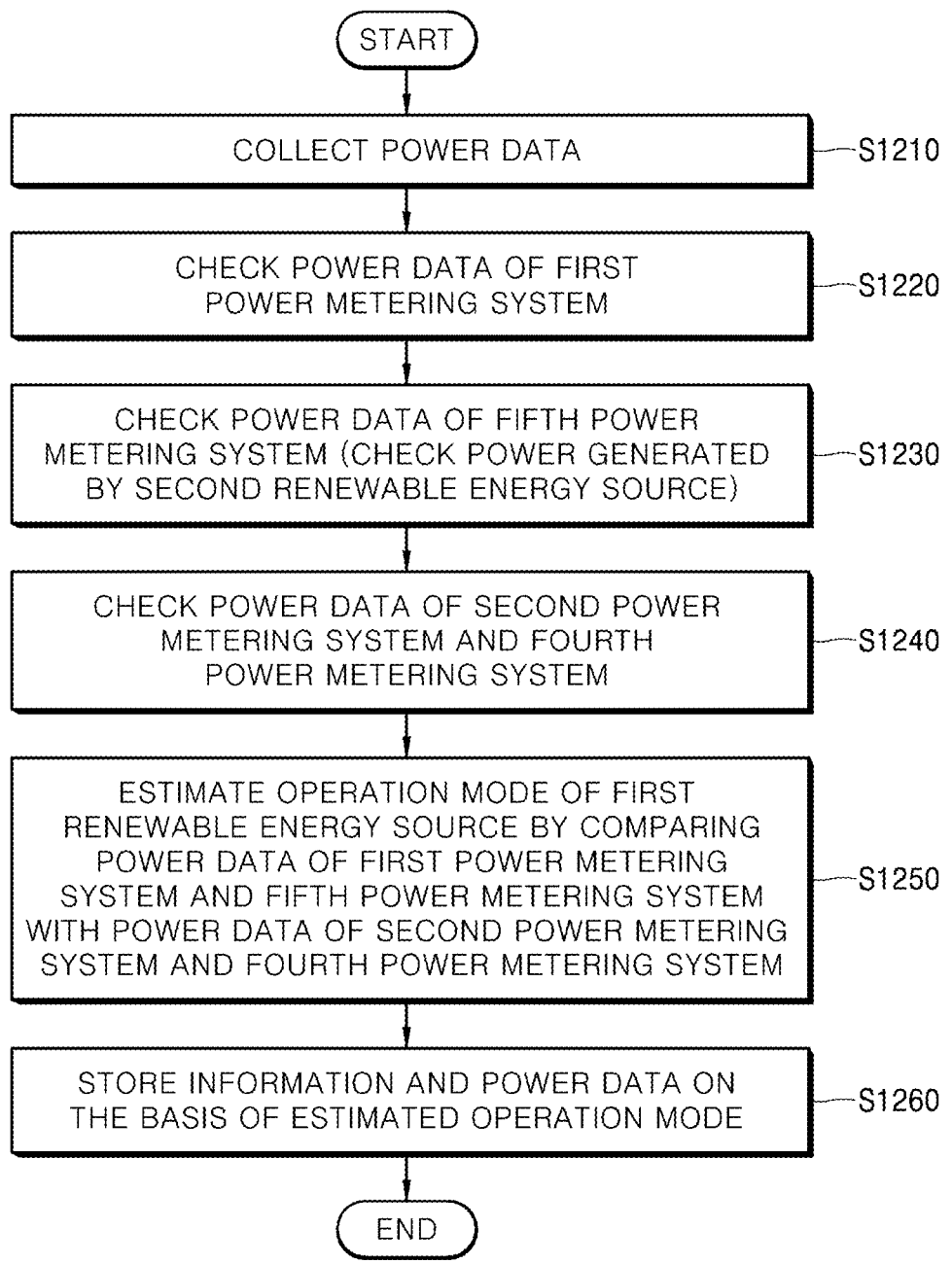
FIGS. 12 to 22 show flow charts illustrating operations of monitoring power consumed by loads to which the system for monitoring power consumed by the loads in accordance with some embodiments of the present disclosure is applied.

FIG. 12 shows a flow chart in accordance with a first embodiment illustrating operations for monitoring power consumed by loads where the EES 140 in the monitoring server 10 operates in AC PASS mode.

Referring to FIG. 12, the monitoring server 10 may collect power data from the power metering systems 171, 172, 173 and 174 through the communication unit 11 at operation S1210.

The control unit 12 of the monitoring server 10 may check power data of the first power metering system 171 through the communication unit 11 at operation S1220. The control unit 12 may check the first power data including the power applied from the external power supply source 110.

After checking the power data of the first power metering system 171, the control unit 12 of the monitoring server 10 may check the fifth power data received from the fifth power metering system 175 at operation S1230. The fifth power data may be the power data generated by a second renewable energy source, in other words, the photovoltaic power generation system 160.

After checking the power data of the fifth power metering system 175, the control unit 12 may check the second power data received from the second power metering system 172 and the fourth power data received from the fourth power metering system 174 at operation S1240. The second power data may include the information about power consumption patterns of and the power consumed by the electronic devices 130 to which power is supplied through the distribution board 120. Moreover, the fourth power data may include the information about the power consumed by and its power consumption patterns of the load 150 connected to one end of the first renewable energy source, that is, the EES 140. The information about power consumption patterns of the second power data and the fourth power data may be obtained through the NILM (Non-intrusive Load Monitoring) algorithm.

Moreover, the information about the power consumed by and the power consumption patterns of the loads connected to the system for monitoring power consumed by loads may be obtained by means of the sum of the power data of the second power metering system 172 and the power data of the fourth power metering system 174.

The control unit 12 may compare the sum of the checked first power data and the fifth power data with the sum of the second power data and the fourth power data to estimate the operation mode of the EES which is a first renewable energy source at operation S1250. In more detail, where the sum of the first power data and the fifth power data is equal to the sum of the second power data and the fourth power data, it is estimated that the EES 140 operates in AC PASS mode.

Therefore, the control unit 12 may estimate that the operation mode of the EES 140 is the AC PASS mode, and estimate the checked fifth power data as the power generated by a second renewable energy source, in other words, the photovoltaic power generation system 160.

The control unit 12 of the monitoring server 10 may store the power data checked through the operation described above and the information about the operation mode of the EES 140 in the storage unit 13 at operation S1260.

Figure 13:
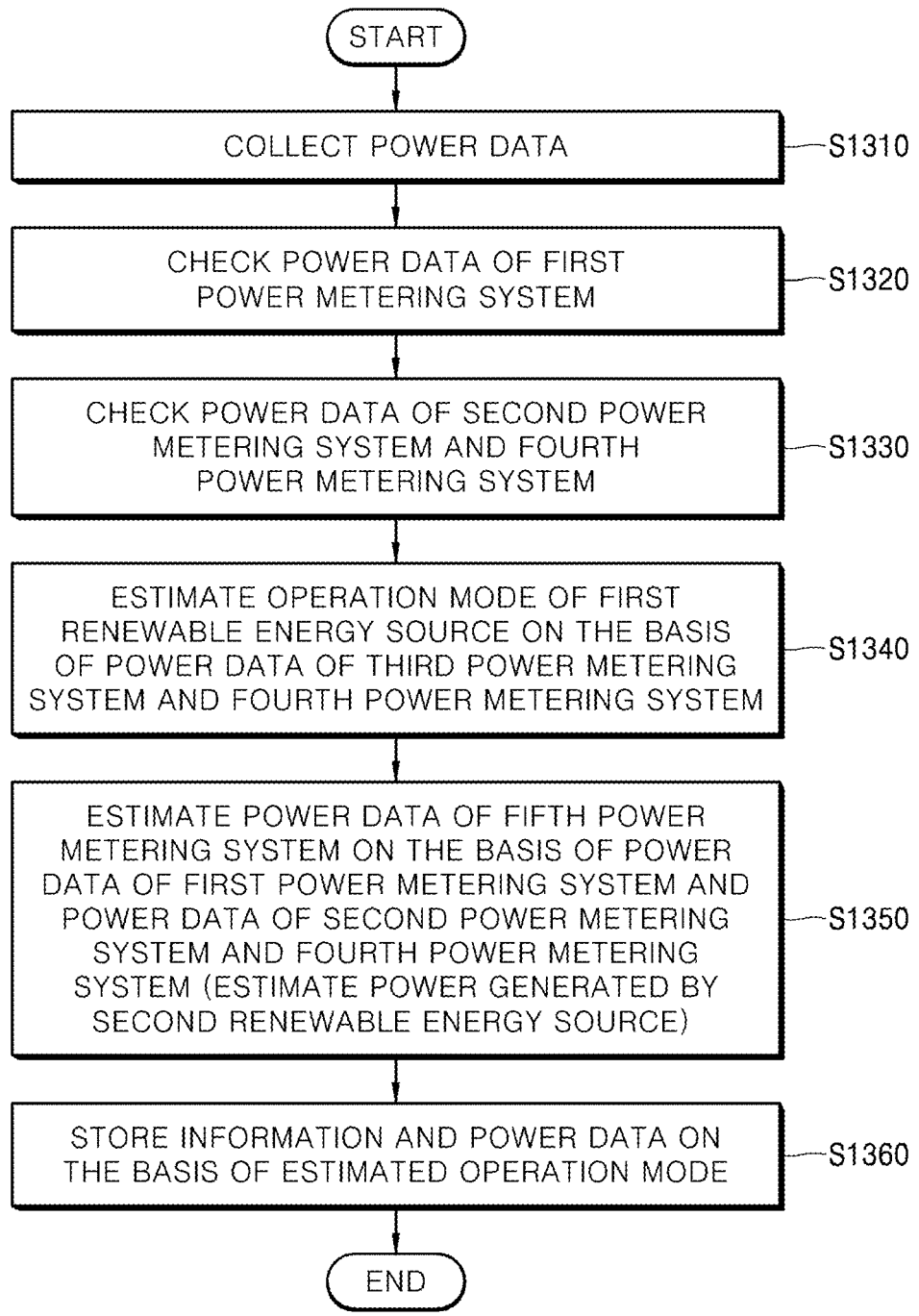

FIG. 13 shows a flow chart of a process of monitoring power consumed by loads where the EES 140 in the monitoring server 10 operates in AC PASS mode in accordance with a second embodiment of the present disclosure.

Referring to FIG. 13, the monitoring server 10 may collect power data from one or more power metering systems 171, 172, 173 and 174 through the communication unit 11 at operation S1310.

The control unit 12 may check the power data of the first power metering system 171 through the communication unit 11 at operation S1320. The control unit 12 may check the first power data including the power applied from the external power supply source 110.

After checking the power data of the first power metering system 171, the control unit 12 may check the second power data received from the second power metering system 172 and the fourth power data received from the fourth power metering system 174 at operation S1330. The second power data may include the information about power consumption patterns of and the power consumed by the electronic device 130 to which power is supplied through the distribution board 120. Furthermore, the fourth power data may include the information about the power consumed by and the power consumption patterns of the load 150 connected to one end of the first renewable energy source, that is, the EES 140. The information about power consumption patterns of the second power data and the fourth power data may be obtained through the NILM (Non-intrusive Load Monitoring) algorithm.

Moreover, the information about the power consumed by and the power consumption patterns of the load connected to the system for monitoring power consumed by loads may be obtained by means of the sum of the power data of the second power metering system 172 and the power data of the fourth power metering system 174.

The control unit 12 may estimate the operation mode of the EES 140 which is a first renewable energy source on the basis of the power data of the third power metering system 173 and the fourth power metering system 174 at operation S1340. In more detail, after comparing the third power data of the third power metering system 173 with the power data of the fourth power metering system 174, the control unit 12 may estimate that the operation mode of the EES 140 is the AC PASS mode where the power data are equal each other.

Therefore, the control unit 12 may calculate the difference of the sum of the second power data and the fourth power data from the first power data to estimate the power generated by the photovoltaic power generation system 160 which is a second renewable energy source at operation S1350.

The control unit 12 of the monitoring server 10 may store the power data checked through the operation described above and the information about the operation mode of the EES 140 in the storage unit 13 at operation S1360.

Figure 14:
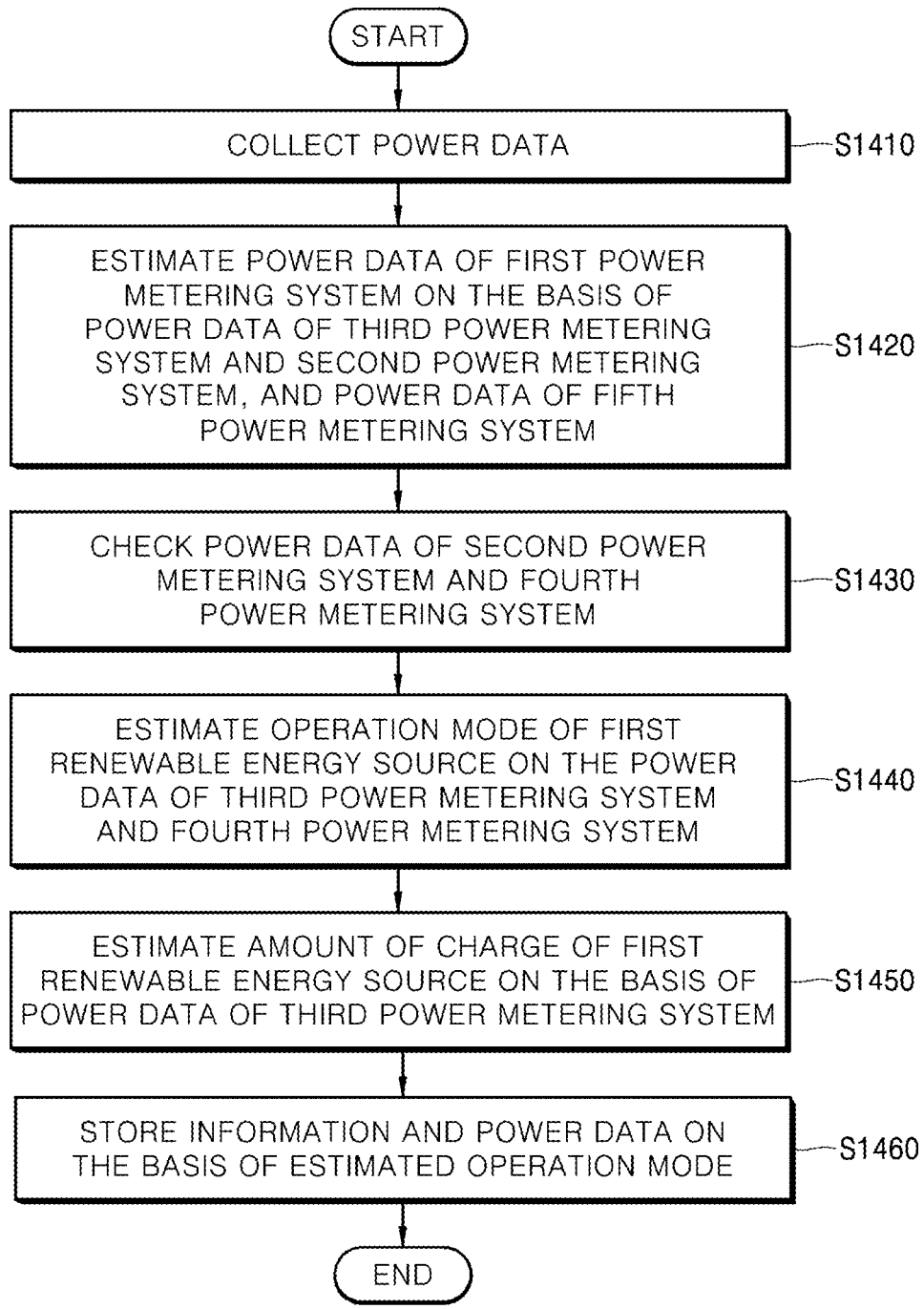

FIG. 14 shows a flow chart in accordance with a third embodiment illustrating operations for monitoring power consumed by loads where the EES 140 in the monitoring server 10 operates in AC PASS mode.

Referring to FIG. 14, the monitoring server 10 may collect power data from the power metering systems 171, 172, 173 and 174 through the communication unit 11 at operation S1410.

The control unit 12 of the monitoring server 10 may estimate the power data applied from the external power supply source 110, that is, the first power data of the first power metering system 171 on the basis of the power data of the third power metering system 173, the second power metering system 172 and the fifth power metering system 175 in the collected power data at operation S1420.

In more detail, the control unit 12 may calculate the difference of the sum of the second power data and the third power data from the fifth power data to estimate the calculated value as a first power data. In other words, the first power data may be estimated by subtracting the power data of the photovoltaic power generation system 160 from the power data applied to the distribution board 120 and the EES 140 which consume power applied from the external power supply source.

The control unit 12 may check the fourth power data received from the fourth power metering system 174 after estimating the power data of the first power metering system 171 at operation S1430. In this example, the control unit 12 may check total power consumed by and power consumption patterns of the load connected to the system for monitoring power consumed by loads by means of the sum of the power data of the second power metering system 172 and the power data of the fourth power metering system 174, checked through the above operation. The second power data and the fourth power data may include the information about the power consumed by and power consumption patterns of respective loads 130 and 150. The information about power consumption patterns of the second power data and the fourth power data may be obtained through the NILM (Non-intrusive Load Monitoring) algorithm.

The control unit 12 may estimate the operation mode of the EES 140 which is a first renewable energy source on the basis of the third power data and the fourth power data at operation S1440. More specifically, the control unit 12 may compare the third power data with the fourth power data to estimate that the operation mode is the AC PASS mode that the EES does not consume power applied from the external power supply source 110 or the photovoltaic power generation 160 where the third power data is equal to the fourth power data.

Therefore, the control unit 12 may estimate the third power data as the amount of charge of the EES 140 at operation S1450.

The control unit 12 of the monitoring server 10 may store the power data checked through the operation described above, the information about the operation mode of the EES 140 and the amount of charge in the storage unit 13 at operation S1460.

Figure 15:
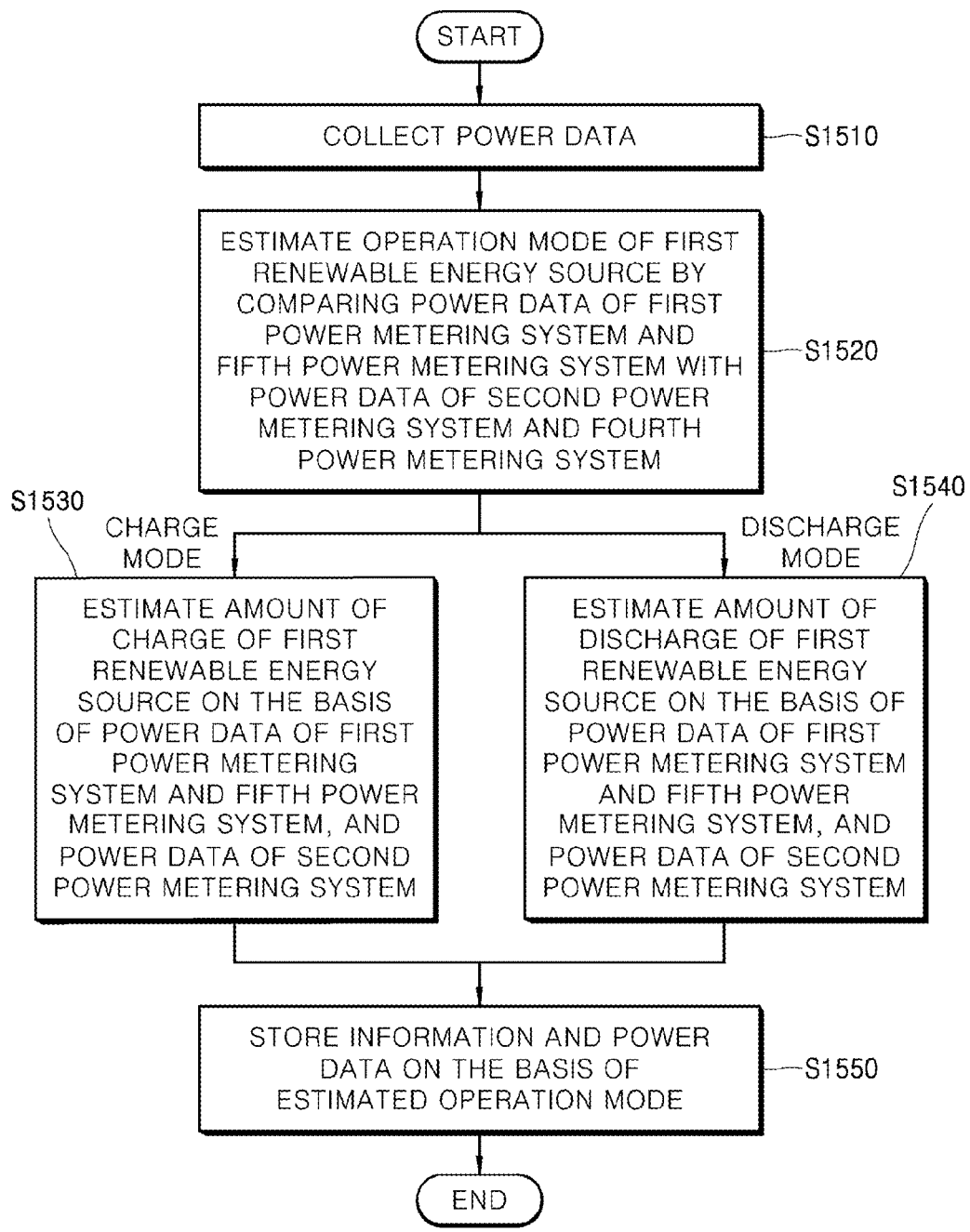

FIG. 15 shows a flow chart in accordance with a first embodiment illustrating operations for monitoring power consumed by loads where the EES 140 in the monitoring server 10 operates in charge mode or discharge mode.

Referring to FIG. 15, the monitoring server 10 may collect power data from the one or more power metering systems 171, 172, 173 and 174 through the communication unit 11 at operation S1510.

The control unit 12 may check respective power data collected from the respective one or more power metering systems 171, 172, 173, 174 and 175. It may estimate the operation mode of the EES 140 by comparing the sum of the first power data and the fifth power data of the first power metering system 171 and the fifth power metering system 175 with the second power data of the second power metering system 172 and the fourth power data of the fourth power metering system 174, and estimate the operation mode of the EES 140 at operation S1520. Specifically, the control unit 12 may estimate the operation mode of the EES 140 is the charge mode where the second power data is smaller than the sum of the first power data and the fifth power data, and the fourth power data is not 0. On the other hand, where the sum of the first power data and the fifth power data is smaller than the second power data, it may estimate that the operation mode of the EES 140 is the discharge mode.

As a result, the control unit 12 may estimate the operation mode of the first renewable energy source, that is, the EES 140, on the basis of the first power data, the second power data, the fourth power data and the fifth power data. After estimating it is the charge mode, the control unit 12 may estimate the power data obtained by subtracting the second power data from the sum of the first power data and the fifth power data as the amount of charge of the EES 140. In this example, the fifth power data may be estimated as the power generated by the photovoltaic power generation system 160 at operation S1530.

Meanwhile, the control unit 12 may estimate the power data obtained by subtracting the second power data from the sum of the first power data and the fifth power data as the amount of discharge of the EES 140 where the operation mode of the EES 140 is estimated as the discharge mode. In this regard, the fifth power data may be estimated as the power generated by the photovoltaic power generation system 160 at operation S1540.

The control unit 12 of the monitoring server 10 may store the information about the power data, the operation mode of the EES 140, and the power data information, checked through the aforementioned operation, in the storage unit 13 at operation S1550.

Figure 16:
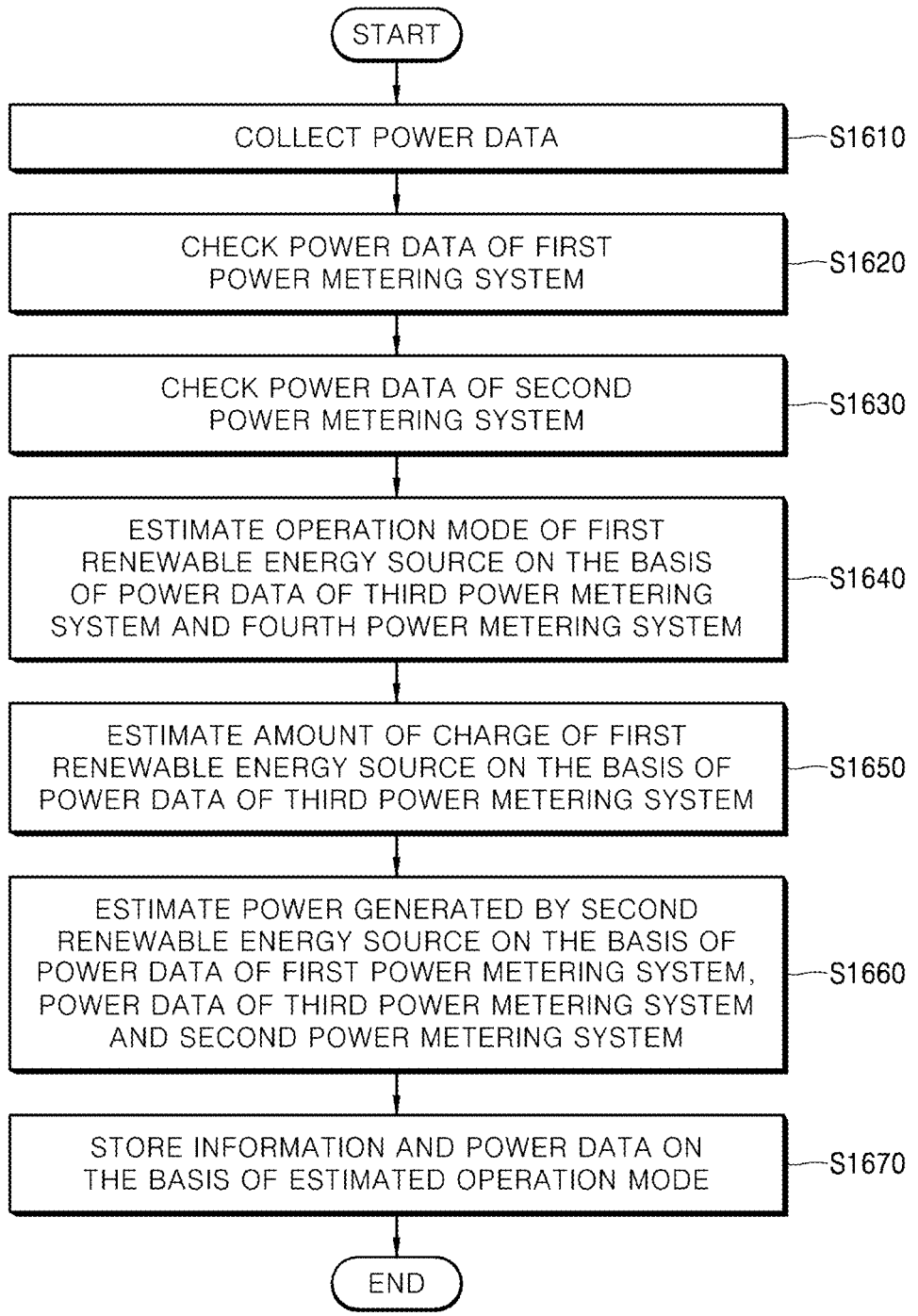

FIG. 16 shows a flow chart in accordance with a second embodiment illustrating operations for monitoring power consumed by loads where the EES 140 in the monitoring server 10 operates in charge mode.

Referring to FIG. 16, the monitoring server 10 may collect power data from the power metering systems 171, 172, 173 and 174 through the communication unit 11 at operation S1610.

The control unit 12 may check the power data of the first power metering system 171 through the communication unit 11 at operation S1620. The control unit 12 may check a first power data including the power applied from the external power supply source 110.

After checking the power data of the first power metering system 171, the control unit 12 of the monitoring server 10 may check the power data received from the second power metering system 172 at operation S1630. The control unit 12 may check the second power data including power consumption patterns of and the power consumed by the electronic devices 130 to which power is supplied through the distribution board 120. In this case, the information about power consumption patterns may be obtained through the NILM (Non-intrusive Load Monitoring) algorithm.

The control unit 12 may estimate the operation mode of the EES 140 which is a first renewable energy source on the basis of the power data of the third power metering system and the fourth power metering system 174 at operation S1640. Specifically, the control unit 12 may check the third power data of the third power metering system 173 and the fourth power data of the fourth power metering system 174, respectively, and estimate that the operation mode of the EES 140 is the charge mode where the third power data is not 0, but the fourth power data is 0.

After estimating the operation mode of the EES 140 as the charge mode, the control unit 12 may estimate the value of the third power data as the amount of charge of the EES 140 at operation S1650.

After estimating the operation mode and the amount of charge of the EES 140, the control unit 12 may estimate the power generated by the photovoltaic power generation system 160 which is a second renewable energy source on the basis of the first power data, the third power data and the second power data at operation S1660. More specifically, after obtaining the difference by subtracting the sum of the third power data and the second power data from the first power data, the control unit 12 may calculate the power data applied from the external power supply source 110, in other words, the fifth power data.

The control unit 12 of the monitoring server 10 may store the power data and the information about the operation mode and power data information of the EES 140 checked through the operation described above in the storage unit 13 at operation S1670.

Figure 17:
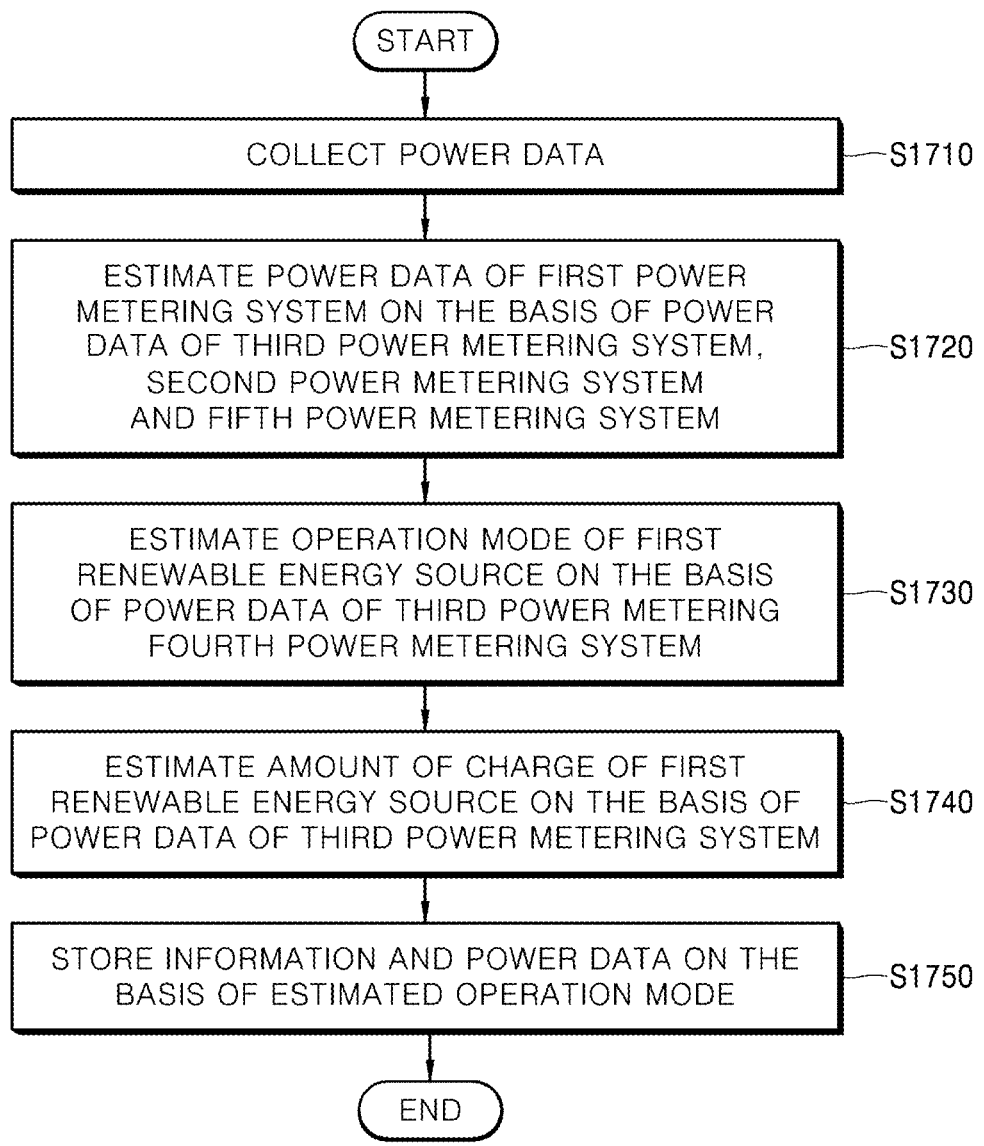

FIG. 17 shows a flow chart in accordance with a third embodiment illustrating operations for monitoring power consumed by loads where the EES 140 in the monitoring server 10 operates in charge mode.

Referring to FIG. 17, the monitoring server 10 may collect power data from the power metering systems 171, 172, 173 and 174 through the communication unit 11 at operation S1710.

The control unit 12 of the monitoring server 10 may estimate the power data applied from the external power supply source 110 which is the first power data of the first power metering system 171 on the basis of the second power data, the third power data and the fifth power data of the second power metering system 172, the third power metering system 173 and the fifth power metering system 175, respectively, collected through the communication unit 11, at operation S1720.

After checking the first power data, the control unit 12 may check the fourth power data of the fourth power metering system 174, and estimate the operation mode of the EES 140 which is a first renewable energy source on the basis of the third power data and the fourth power data checked through the above operation, at operation S1730. In more detail, the control unit 12 may check the third power data and the fourth power data, and estimate that the EES 140 is in charge mode for charging the power applied from the external power supply source 110 or the photovoltaic power generation system 160 and not discharging the power into the load 150 connected to one end thereof. This is based on the result that the third power data is not 0 but the fourth power data is 0.

After estimating the operation mode of the EES 140 as the charge mode, the control unit 12 may estimate the third power data as the amount of charge of the EES 140 at operation S1740.

The control unit 12 may store the estimated operation mode information and the power data information of the EES 140 in the storage unit 13 at operation S1750.

Figure 18:
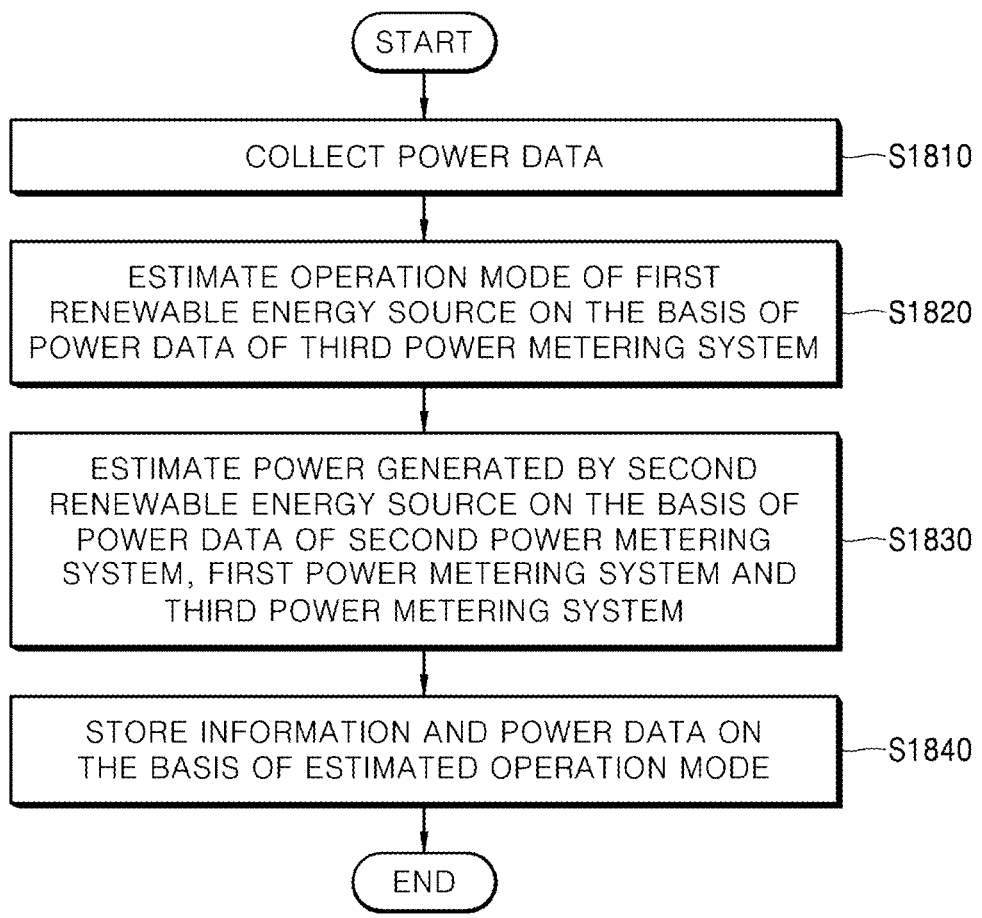

FIG. 18 shows a flow chart in accordance with a first embodiment illustrating operations for monitoring power consumed by loads where the EES 140 in the monitoring server 10 operates in discharge mode.

Referring to FIG. 18, the monitoring server 10 may collect power data from the power metering systems 171, 172, 173 and 174 through the communication unit 11 at operation S1810.

The control unit 12 of the monitoring server 10 may check the third power data of the third power metering system 173 collected through the communication unit 11 in the power data, and estimate the operation mode of the EES 140 which is a first renewable energy source on the basis of the third power data at operation S1820. In more detail, where the third power data is 0, the control unit 12 may estimate that power is not applied from the external power supply source 110 or the photovoltaic power generation system 160, and estimate that the operation mode of the EES 140 is the discharge mode for discharging power into the load 150 connected to one end thereof.

After estimating that the EES 140 is in discharge mode, the control unit 12 may estimate the power generated by the photovoltaic power generation system 160 on the basis of the first power data of the first power metering system 171, the second power data of the second power metering system 172 and the third power data of the third power metering system 173, collected through the above operation, at operation S1830. In more detail, the control unit 12 may estimate the power generated by the photovoltaic power generation system 160 by subtracting the sum of the second power data and the third power data from the first power data.

The control unit 12 may store the estimated operation mode information and power data information of the EES 140 in the storage unit 13 at operation S1840.

Figure 19:
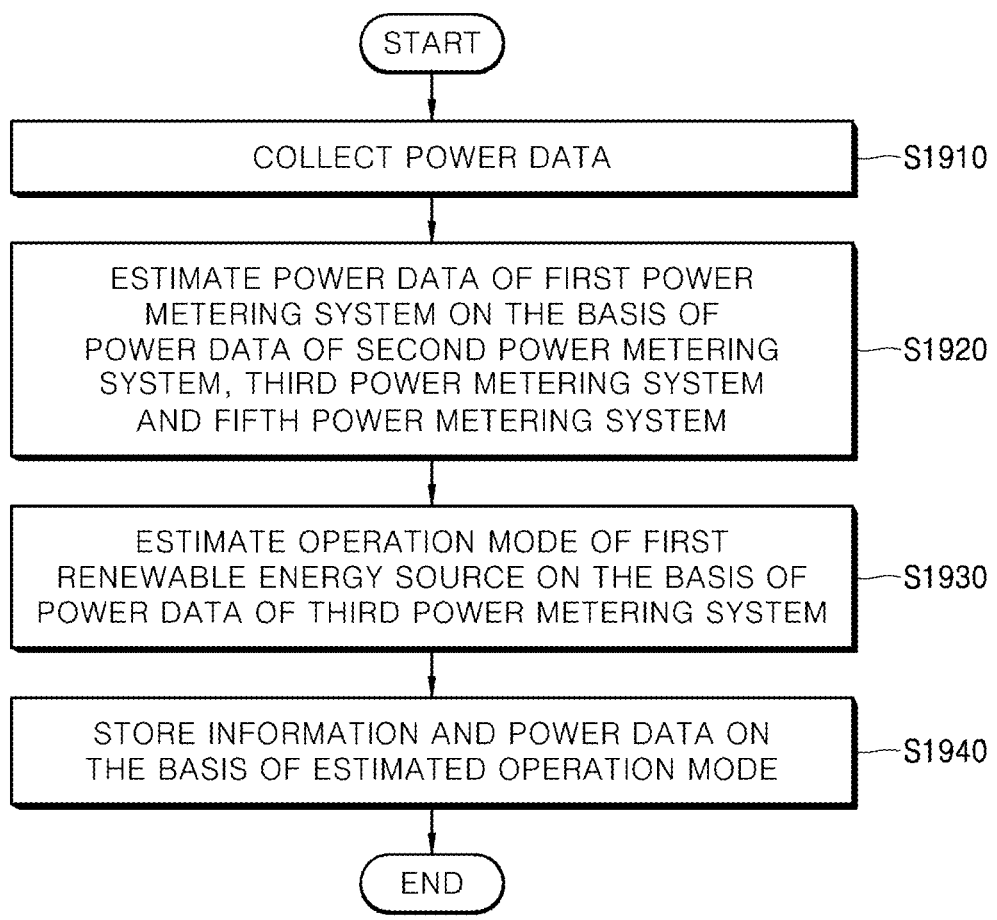

FIG. 19 shows a flow chart in accordance with a second embodiment illustrating operations for monitoring power consumed by loads where the EES 140 in the monitoring server 10 operates in discharge mode.

Referring to FIG. 19, the monitoring server 10 may collect power data from the power metering systems 171, 172, 173 and 174 through the communication unit 11 at operation S1910.

The control unit 12 may estimate the first power data of the first power metering system 171, that is, the power data applied from the external power supply source 110 with reference to the second power data, the third power data and the fifth power data collected from the second power metering system 172, the third power metering system 173 and the fifth power metering system 175 through the communication unit 11 at operation S1920. Specifically, the control unit 12 may calculate the first power data by subtracting the sum of the second power data and the third power data from the fifth power data.

After estimating the first power data, the control unit 12 may estimate the operation mode of the EES 140 which is a first renewable energy source on the basis of the third power data .at operation S1930. In more detail, after checking the third power data, and where the third power data is 0, the control unit 12 may estimate that no power is applied to the EES 140 and the operation mode is thus the discharge mode in which the power stored in the EES 140 is discharged into the load 150 connected to one end thereof. As a result, after estimating the operation mode of the EES 140 is the discharge mode, the control unit 12 may estimate the fourth power data as the amount of discharge. Furthermore, it may estimate that the fifth power data is the power generated by the photovoltaic power generation system 160.

The control unit 12 may store the estimated operation mode information and the power data information of the EES 140 in the storage unit 13 at operation S1940.

Figure 20:
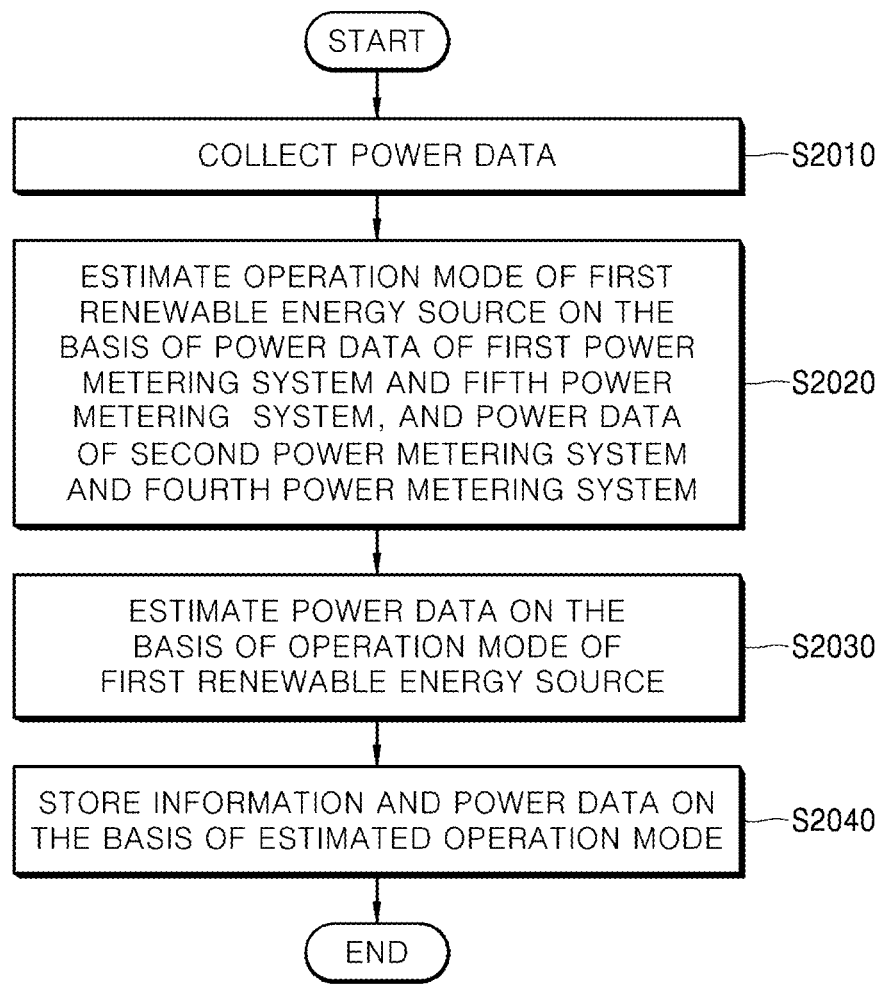

FIG. 20 16 shows a flow chart in accordance with a first embodiment illustrating operations for monitoring power consumed by loads to estimate the operation mode of the EES 140 in the monitoring server 10 and resulting power data.

Referring to FIG. 20, the monitoring server 10 may collect power data from one or more power metering systems 171, 172, 173 and 174 through the communication unit 11 at operation S2010.

The control unit 12 may estimate the operation mode of the EES 140 which is a first renewable energy source at operation S2020 on the basis of the first power data, the fifth power data, the second power data and the fourth power data collected, respectively, from the first power metering system 171, the fifth power metering system 175, the second power metering system 172, and the fourth power metering system 174 in the collected data. In more detail, the control unit 12 compares the sum of the first power data and the fifth power data checked through the above operation with the sum of the fourth power data and the second power data to estimate the operation mode of the EES 140. In other words, the control unit 12 may estimate that the EES 140 is in charge mode. It is because the power applied from the external power supply source 110 and the photovoltaic power generation system 160 is greater than the power consumed in the loads where the sum of the first power data and the fifth power data is greater than the sum of the fourth power data and the second power data.

After estimating the EES 140 is in charge mode, the control unit 12 may estimate the amount of charge of the EES 140 by calculating the difference of the sum of the first power data and the fifth power data from the sum of fourth power data and the second power data at operation S2030.

The control unit 12 may store the estimated operation mode information and power data information of the EES 140 in the storage unit 13 at operation S2040.

Figure 21:
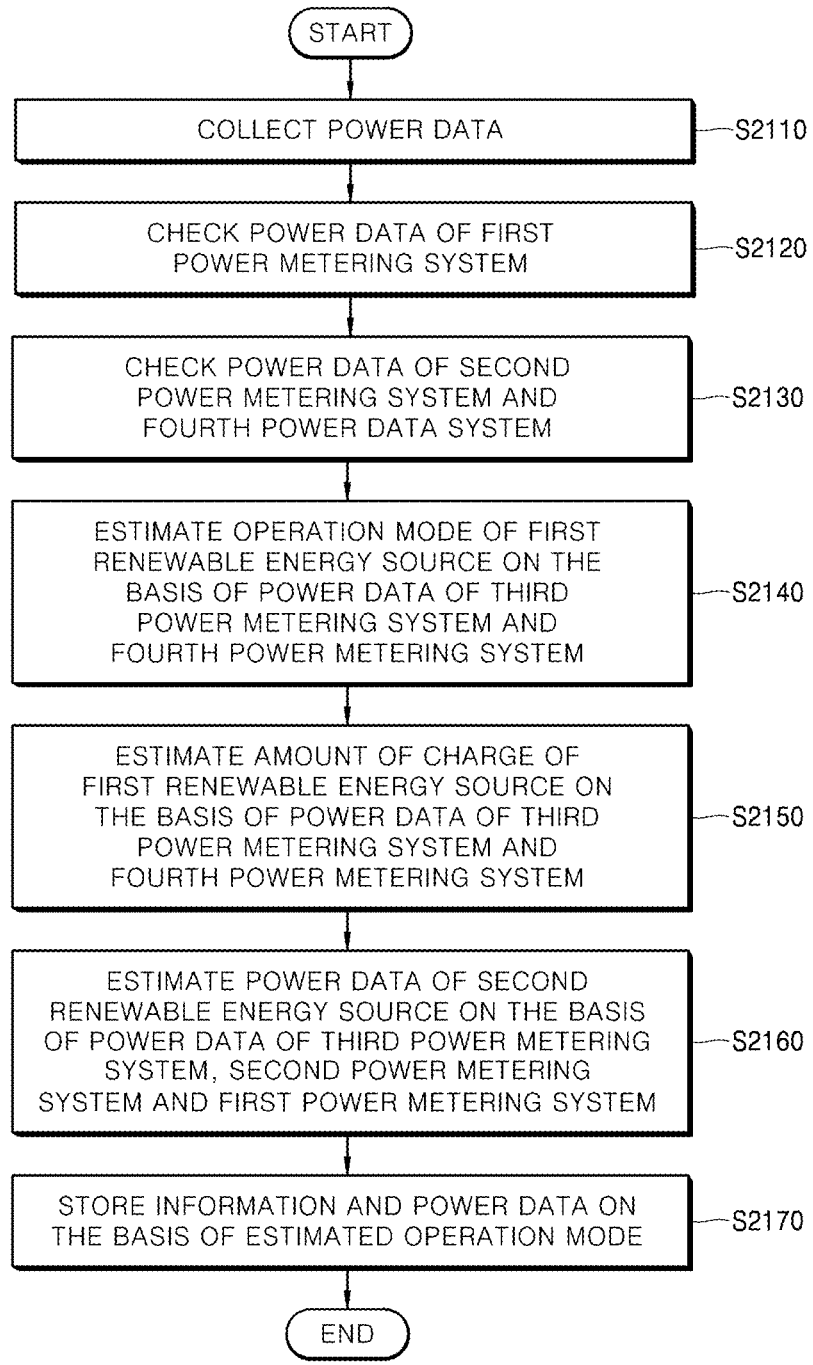

FIG. 21 shows a flow chart in accordance with a second embodiment illustrating operations for monitoring power consumed by loads to estimate the operation mode of the EES 140 in the monitoring server 10 and resulting power data.

Referring to FIG. 21, the monitoring server 10 may collect power data from one or more power metering systems 171, 172, 173 and 174 through the communication unit 11 at operation S2110.

The control unit 12 may check the first power data of the first power metering system 171 in the collected power data at operation S2120.

After checking the first power data, the control unit 12 may check the power data of the second power metering system 172 and the fourth power metering system 174 at operation S2130. In this example, the control unit 12 may check total power consumed by the loads connected to the monitoring system and their power consumption patterns by means of the sum of the second power data of the second power metering system 172 and the fourth power data of the fourth power metering system 174. The second power data and the fourth power data may include the information about the power consumed by respective loads 130 and 150 and their power consumption patterns. The information about the power consumption patterns for the second power data and the fourth power data may be obtained through the NILM (Non-intrusive Load Monitoring) algorithm.

The control unit 12 may estimate the operation mode of the first renewable energy source on the basis of the third power data and the fourth power data of the third power metering system 173 and the fourth power metering system 174 in the collected power data at operation S2140. In more detail, the control unit 12 may estimate that the operation mode of the EES 140 is the charge mode where the third power data is greater than the fourth power data, in other words, the power data applied to the EES 140 is greater than the power consumed in the load 150 connected to one end thereof.

The control unit 12 may estimate the amount of charge of the EES 140 which is a first renewable energy source on the basis of the difference of the third power data from the fourth power data on the basis of the estimated operation mode of the EES 140 at operation S2150.

After estimating the operation mode and power data of the first renewable energy source and on the basis of the first power data, the second power data and the third power data of the first power metering system 171, the second power metering system 172 and the third power metering system 173, respectively, the control unit 12 may estimate the power generated by the photovoltaic power generation system 160 which is a second renewable energy source at operation S2160. In more detail, the control unit 12 may estimate the power generated by the photovoltaic power generation system 160 which is a second renewable energy source by subtracting the first power data from the sum of the third power data and the second power data.

The control unit 12 may store the estimated operation mode information and power data information of the EES 140 in the storage unit 13 at operation S2170.

Figure 22:
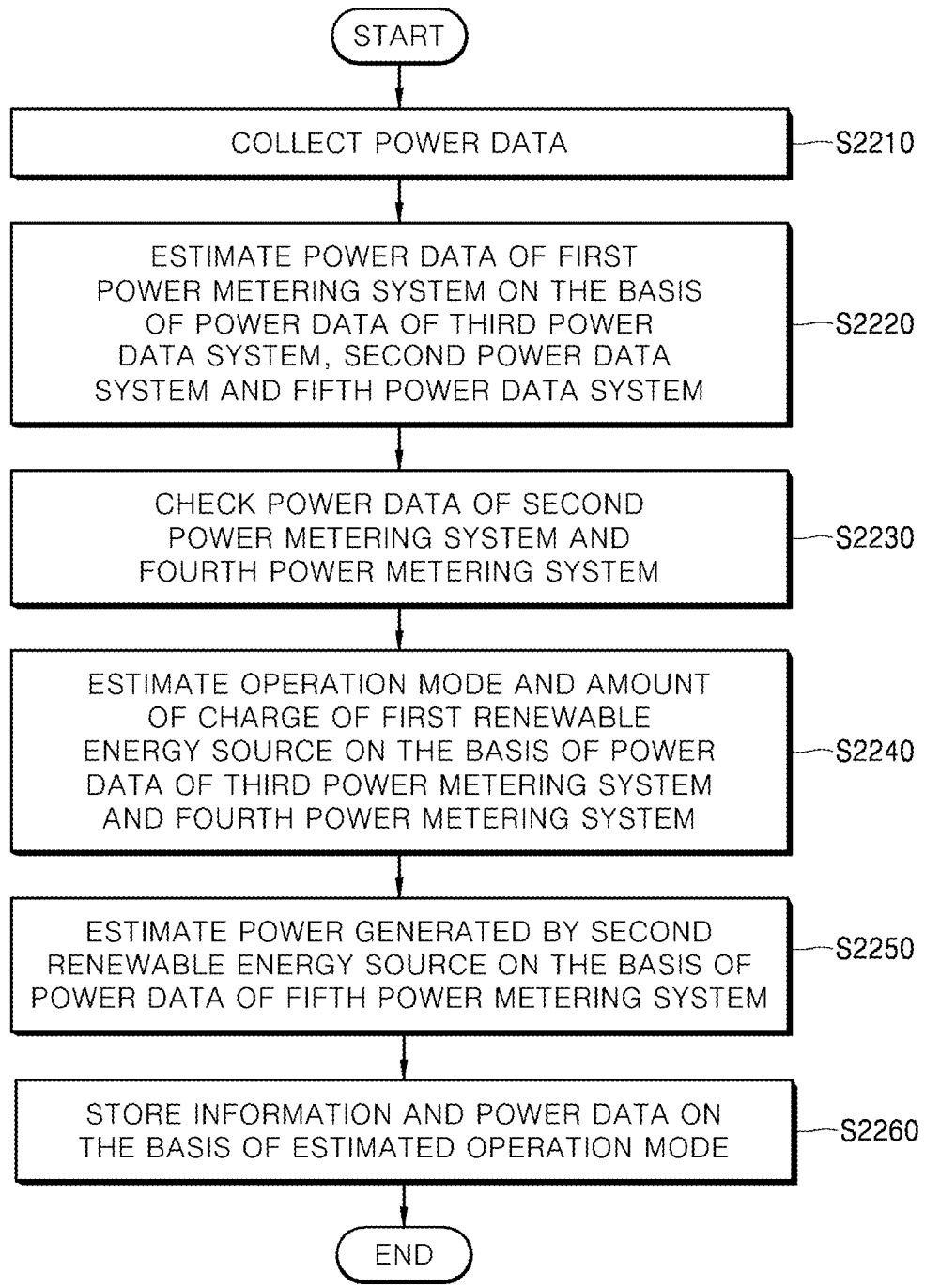

FIG. 22 shows a flow chart in accordance with a third embodiment illustrating operations for monitoring power consumed by loads to estimate the operation mode of the EES 140 in the monitoring server 10 and resulting power data.

Referring to FIG. 22, the monitoring server 10 may collect power data from one or more power metering systems 171, 172, 173 and 174 through the communication unit 11 at operation S2210.

The control unit 12 may estimate the power data coming from the external power supply source 110, that is, the first power data checked by the first power metering system 171 at operation S2220. This is based on the second power data, the third power data and the fifth power data of the second power metering system 172, the third power metering system 173 and the fifth power metering system 175 in the collected power data. In more detail, the control unit 12 may estimate the first power data applied from the external power supply source 110 by subtracting the fifth power data from the sum of the third power data and the second power data.

After estimating the first power data, the control unit 12 may check the power data of the second power metering system 172 and the fourth power metering system 174 at operation S2230. In this example, the control unit 12 may check total power consumed by the loads connected to the system for monitoring power consumed by loads and their power consumption patterns by means of the sum of the second power data of the second power metering system 172 and the fourth power data of the fourth power metering system 174. The second power data and the fourth power data may include the information about the power consumed by respective loads 130 and 150 and their power consumption patterns. The power consumption pattern information about the second power data and the fourth power data may be obtained through the NILM (Non-intrusive Load Monitoring) algorithm.

The control unit 12 may estimate the operation mode of the EES 140 which is a first renewable energy source on the basis of the third power data and the fourth power data at operation S2240. In more detail, the control unit 12 may estimate that the operation mode of the EES 140 is the charge mode where the third power data is greater than the fourth power data, that is, the power data applied to the EES 140 is greater than the energy of power consumed in the load 150 connected to one end thereof.

The control unit 12 may estimate the amount of charge of the EES 140 which is a first renewable energy source on the basis of the difference of the third power data from the fourth power data in accordance with the estimated operation mode of the EES 140.

Moreover, after estimating the operation mode of the EES 140 which is a first renewable energy source as charge mode, the control unit 12 may estimate the power (fifth power data) generated by the photovoltaic power generation system 160 which is a second renewable energy source on the basis of the fifth power data at operation S2250.

The control unit 12 may store the estimated operation mode information and power data information of the EES 140 in the storage unit 13 at operation S2260.

As described above, the system for monitoring power consumed by loads in accordance with some embodiments of the present disclosure may be configured to include a plurality of renewable energy sources including an electric energy storage for storing power applied from external power supply sources and a photovoltaic power generation system for generating power by means of photovoltaic power generation. In particular, the EES which is a first renewable energy source may pass or discharge the power from an external power supply source, or charge the loads connected to one end thereof with the power, and the power generated by the photovoltaic power generation system which is a second renewable energy source. The power data based on power consumption described above may be estimated or checked on the basis of the power data obtained from at least one or more power metering systems which configure the system for monitoring power consumed by loads. Moreover, the operation mode of the aforementioned renewable energy sources may be estimated on the basis of the power data estimated or checked through the above operation.

Figure 24:
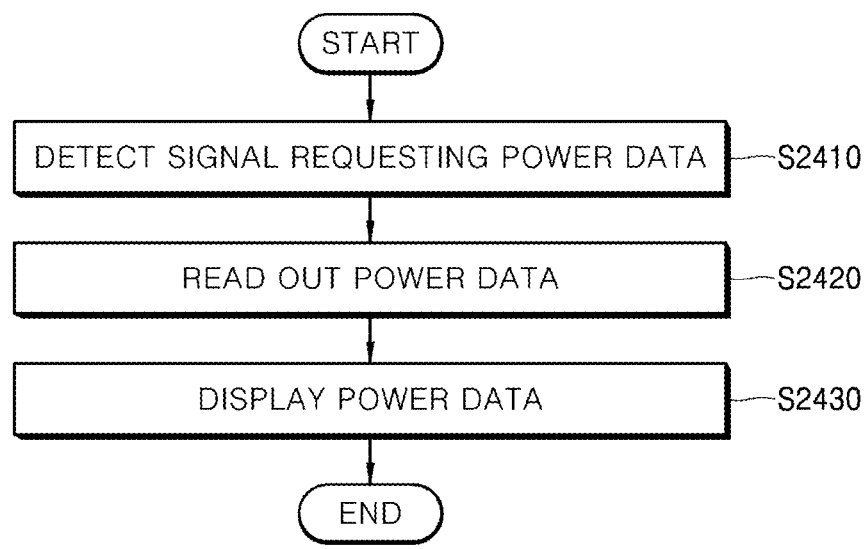
FIG. 24 shows a flow chart illustrating operations of outputting the result of monitoring power consumed by loads in accordance with some embodiments of the present disclosure.
Figure 25:
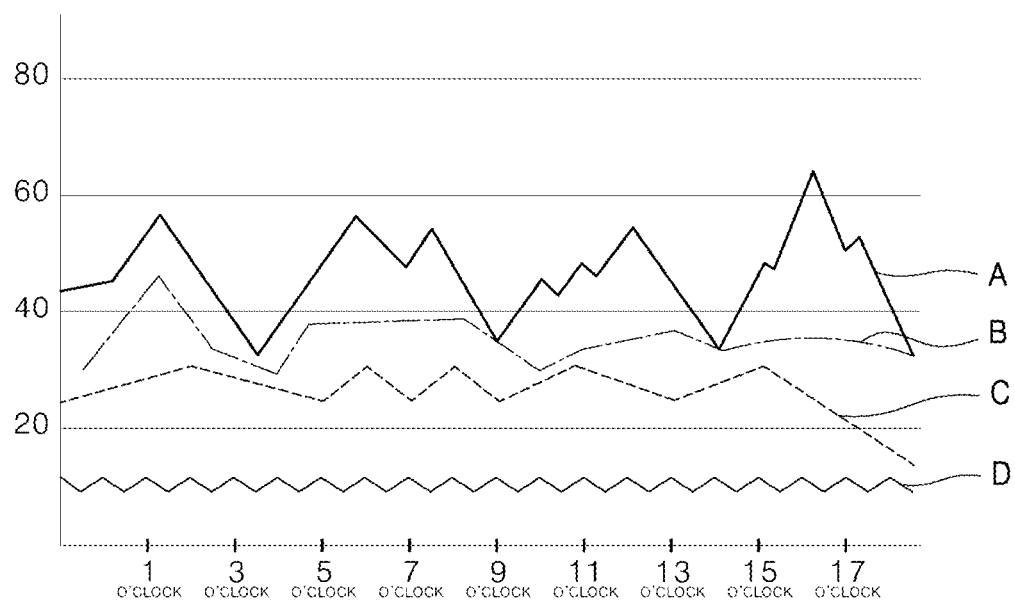
FIG. 25 shows output of the result of monitoring power consumed by loads in accordance with some embodiments of the present disclosure.

FIG. 24 shows a flow chart for outputting the result of monitoring power consumed by loads in accordance with some embodiments of the present disclosure, and FIG. 25 illustrates the process of outputting the result of monitoring power consumed by loads in accordance with some embodiments of the present disclosure.

While referring to FIGS. 24 and 25, the operation for outputting the result of monitoring power consumed by loads stored in the storage unit 13 of the monitoring server 10 in accordance with some embodiments of the present disclosure is described in detail.

Referring to FIGS. 24 and 25, the control unit 12 of the monitoring server 10 may detect the signal of requesting output of the power data measured, obtained and stored in the storage unit 13 in accordance with some embodiments of the present disclosure at operation S2410. The output request signal may be inputted through a user input unit (not shown) or received from a remote terminal through wire-based or wireless communication.

The control unit 12 of the monitoring server 10 may extract the power data stored in the storage unit 13 at operation S2420 and display the power data in various forms, for example, graphs shown in FIG. 25, numerals, or text at operation S2430. FIG. 25 illustrates graphic information of the power consumed by or the amount of charge of the consumer electronics and renewable energy sources. In the example, A to C represent power data of the electronic devices 130, and D represents power data of the renewable energy sources 140 and 160. For the power data of consumer electronics, the cycle of power data may be shown short as the data required for NILM analysis are detected In some embodiments of the present disclosure, the operations for measuring or estimating power data in the external power supply source 110, the electronic device 130 connected to the distribution board 120, the EES 140 and the photovoltaic power generation system 160, respectively, are described in sequence. However, it should be noted that the operation processes for estimating or measuring the aforementioned power data are not limited to those described above, and may be varied in types and performed.

As described above, the power metering systems, the system and the method for monitoring power consumed by loads by using the system in accordance with some embodiments of the present disclosure may configure a system of high reliability and high performance with minimum costs, and thereby implement efficient use of the power consumed by loads.

While the embodiments of the present disclosure include been shown and described, it should be noted that the technical idea of the present disclosure is not limited to the specific embodiments described above. It will be understood that those skilled in the art can make various changes and modifications without departing from the scope of the present disclosure as defined in the following claims. It should be noted that the aforementioned changes and modifications shall not be understood individually to be different from the technical idea or prospects of the present disclosure. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for monitoring power consumed by loads, the system comprising:
   an external power supply source;
   a renewable energy source configured to generate power or store the power applied from the external power supply source, and discharge the generated or stored power;
   a distribution board configured to distribute the power applied from the external power supply source or the renewable energy source into electronic devices;
   one or more power metering systems configured to detect a plurality of power data from the external power supply source, the renewable energy source, or the distribution board, respectively; and
   a monitoring server configured to collect power data detected in the respective one or more power metering systems, and monitor the operation mode of the renewable energy source, or the power consumed by loads on the basis of the collected power data,
   wherein the monitoring server checks the collected power data; estimates power data that is not collected on a basis of the collected power data; and estimates an operation mode of the renewal energy source based on the collected power data and the estimated power data.

2. The system of claim 1, wherein the renewable energy source is at least one of a photovoltaic power generation system or an EES (electric energy storage).

3. The system of claim 2, wherein the system comprises a load connected to one end of the EES where the renewable energy source is the EES, and the EES applies power to the load.

4. The system of claim 3, wherein a power metering system for detecting the power data applied from the external power supply source is connected to one end of the EES, and a power metering system is connected to the other end thereof to detect the power data consumed by the load.

5. The system of claim 4, wherein the server obtains power consumption patterns from the power data detected from a power metering system connected to the distribution board and a power metering system connected to the other end of the EES by means of the NILM (Non-intrusive Load Monitoring) algorithm.

6. The system of claim 3, wherein the operation mode of the EES is estimated on the basis of the power data of a power metering system configured in the other end of the distribution board and the EES.

7. The system of claim 6, wherein the EES is estimated to be in AC PASS mode where the power data of the one or more power metering systems are equal to the power data applied from the external power supply source.

8. The system of claim 6, wherein the EES is estimated to be in charge mode where the power data of the power metering system configured at the other end of the EES is 0.

9. The system of claim 6, wherein the EES is estimated to be in discharge mode where the power data of the power metering system configured at one end of the EES is smaller than the power data of the power metering system configured at the other end thereof.

10. The system of claim 1, wherein the renewable energy source comprises:
    a first renewable energy source configured to store or pass the power applied from the external power supply source and apply the stored or passed power to a load connected to one end thereof; and
    a second renewable energy source configured with a power generation system for generating power, and
    wherein the first renewable energy source is an EES, and the second renewable energy source is a power generation system.

11. The system of claim 10, wherein the power generated by the power generation system is applied to the EES.

12. The system of claim 10, wherein a power metering system configured to detect the power data generated by the power generation system is connected to one end of the power generation system.

13. A power metering system for metering power, the system comprising:
    an external power supply source;
    a first renewable energy source configured to generate power;
    a second renewable energy source configured to receive power from the external power supply source or the first renewable energy source and supply the power to a load connected to one end thereof;
    a distribution board configured to receive power from the external power supply source or the first renewable energy source, and distribute the power to electronic devices;
    a power metering system configured to detect power data of the external power supply source, the renewable energy sources or the distribution board;
    a power metering system configured to detect the power data of the second renewable energy source; and
    a control unit configured to each power metering system;
    wherein the control unit checks the collected power data of the external power supply source, the renewable energy sources or the distribution board; estimates power data that is not collected on a basis of the collected power data; and estimates an operation mode of the renewal energy source based on the collected power data and the estimated power data.

14. The system of claim 13, wherein one end and the other end of the second renewable energy source have a power metering system connected thereto, respectively.

15. The system of claim 13, wherein the first renewable energy source is a power generation system; and
    the second renewable energy source is an EES.

* * * * *